US011209278B2

(12) United States Patent
König et al.

(10) Patent No.: US 11,209,278 B2
(45) Date of Patent: Dec. 28, 2021

(54) ALTERNATIVE ROUTES

(71) Applicant: TomTom Navigation B.V., Amsterdam (NL)

(72) Inventors: Felix Godafoss König, Berlin (DE);
Michael Marte, Berlin (DE); Jose F.
Santiago Nunez, Amsterdam (NL);
Kees Wesselius, Amsterdam (NL);
Stanislav Zheltov, Amsterdam (NL);
Thomas Gerhard Helmut
Schickinger, Berlin (DE); William
Breen, Amsterdam (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 327 days.

(21) Appl. No.: 15/520,414

(22) PCT Filed: Oct. 20, 2015

(86) PCT No.: PCT/EP2015/074286
§ 371 (c)(1),
(2) Date: Apr. 20, 2017

(87) PCT Pub. No.: WO2016/062732
PCT Pub. Date: Apr. 28, 2016

(65) Prior Publication Data
US 2017/0314944 A1 Nov. 2, 2017

(30) Foreign Application Priority Data

Oct. 20, 2014 (GB) .................................... 1418569
Oct. 20, 2014 (GB) .................................... 1418571
Oct. 20, 2014 (GB) .................................... 1418573

(51) Int. Cl.
G06F 17/00 (2019.01)
G01C 21/34 (2006.01)
G01C 21/36 (2006.01)

(52) U.S. Cl.
CPC ..... *G01C 21/3415* (2013.01); *G01C 21/3461* (2013.01); *G01C 21/3484* (2013.01);
(Continued)

(58) Field of Classification Search
CPC ............ G01C 21/3415; G01C 21/3461; G01C 21/3484; G01C 21/34; G01C 21/3492; G01C 21/3661; G01C 21/3676
(Continued)

(56) References Cited

U.S. PATENT DOCUMENTS 6,253,146 B1    6/2001  Hanson et al.
6,321,161 B1 *  11/2001 Herbst ............... G01C 21/3415
                                                    340/905
(Continued)

FOREIGN PATENT DOCUMENTS

EP    0803708 A2    10/1997
EP    0854463 A2    7/1998
(Continued)

OTHER PUBLICATIONS

International Search Report dated Jan. 25, 2016 for application No. PCT/EP2015/074286.
(Continued)

*Primary Examiner* — Ronnie M Mancho
(74) *Attorney, Agent, or Firm* — Park, Vaughan, Fleming & Dowler LLP

(57) ABSTRACT

A method is disclosed for determining a route taken by a user at a decision point in a navigable network in an area covered by an electronic map. The map comprises a plurality
(Continued)

of segments representing navigable segments of the navigable network in the area covered by the electronic map. A user is travelling along a main route from an origin to a destination. An upcoming decision point is identified, and one or more alternative routes between the decision point and the destination generated. Data indicative of each route is stored in a route pool, associated with data indicative of the outgoing segment at the decision point that forms part of the route. Each route passes along a different outgoing segment, and which segments are all different to an outgoing segment included in a continuation of the main route. When the user has passed through the decision point, it is determined whether the current position of the user lies on the outgoing segment forming the continuation of the main route. If so, the main route continues to be used as the main route after passing through the decision point. If not, it is determined whether the current position is on an outgoing segment associated with one of the stored alternative routes. If so, then this alternative route is used as the new main route after the decision point. If not, a new alternative route from the decision point to the destination passing along the outgoing segment on which the current position is found is generated, and used as the new main route after passing the decision point.

16 Claims, 12 Drawing Sheets

(52) U.S. Cl.
CPC ......... *G01C 21/34* (2013.01); *G01C 21/3492* (2013.01); *G01C 21/3661* (2013.01); *G01C 21/3676* (2013.01)

(58) Field of Classification Search
USPC .................................................. 701/400, 411
See application file for complete search history.

(56) References Cited

U.S. PATENT DOCUMENTS

| 7,522,995 | B2* | 4/2009 | Nortrup | G01C 21/3667 |
| | | | | 340/995.19 |
| 2002/0128773 | A1 | 9/2002 | Chowanic et al. | |
| 2008/0051992 | A1* | 2/2008 | Yamada | G01C 21/32 |
| | | | | 701/533 |
| 2009/0157292 | A1 | 6/2009 | Currie et al. | |
| 2010/0082235 | A1 | 4/2010 | Dicke et al. | |
| 2010/0324817 | A1* | 12/2010 | Hansen | G01C 21/3415 |
| | | | | 701/414 |
| 2011/0301837 | A1* | 12/2011 | Wellmann | G01C 21/3446 |
| | | | | 701/410 |
| 2012/0173134 | A1* | 7/2012 | Gutman | G01C 21/3469 |
| | | | | 701/400 |
| 2012/0221247 | A1* | 8/2012 | Aben | G01C 21/36 |
| | | | | 701/537 |
| 2012/0303265 | A1* | 11/2012 | Su | G01C 21/3697 |
| | | | | 701/419 |
| 2012/0303266 | A1* | 11/2012 | Su | G01C 21/3476 |
| | | | | 701/420 |
| 2013/0166187 | A1* | 6/2013 | Saunders | G08G 1/0133 |
| | | | | 701/117 |
| 2013/0204525 | A1* | 8/2013 | Pfeifle | G08G 1/09626 |
| | | | | 701/533 |
| 2013/0297207 | A1* | 11/2013 | Mason | G01C 21/3407 |
| | | | | 701/533 |
| 2013/0345979 | A1* | 12/2013 | Oostveen | G01C 21/3694 |
| | | | | 701/533 |
| 2014/0005924 | A1 | 1/2014 | Letz | |
| 2014/0019041 | A1* | 1/2014 | Kluge | G01C 21/3469 |
| | | | | 701/430 |
| 2014/0100780 | A1* | 4/2014 | Caine | G01C 21/3453 |
| | | | | 701/533 |
| 2014/0188390 | A1* | 7/2014 | Tuukkanen | G01C 21/3492 |
| | | | | 701/533 |
| 2014/0236482 | A1* | 8/2014 | Dorum | G01C 21/34 |
| | | | | 701/533 |
| 2014/0278052 | A1* | 9/2014 | Slavin | G01C 21/3492 |
| | | | | 701/400 |
| 2014/0278070 | A1* | 9/2014 | McGavran | G01C 21/00 |
| | | | | 701/465 |

FOREIGN PATENT DOCUMENTS

| EP | 0943896 | A2 | 9/1999 |
| EP | 1471329 | A2 | 10/2004 |
| EP | 2551639 | A1 | 1/2013 |
| TW | 201017201 | A | 5/2010 |
| TW | 201027042 | A | 7/2010 |
| WO | 2010040385 | A1 | 4/2010 |
| WO | 2010072258 | A1 | 7/2010 |
| WO | 2012167148 | A2 | 12/2012 |
| WO | 2014001549 | A1 | 1/2014 |

OTHER PUBLICATIONS

Search Report dated Apr. 20, 2015 for GB Application No. 1418571.4.
International Search Report dated Jan. 26, 2016 for application No. PCT/EP2015/074284.
Search Report dated Apr. 21, 2015 for GB Application No. 1418569.8.
Search Report dated Oct. 26, 2015 for GB Application No. 1418573.0.

* cited by examiner

ALTERNATIVE ROUTES

CROSS-REFERENCE TO RELATED APPLICATIONS

The present application is a National Stage of International Application No. PCT/EP2015/074286, filed on Oct. 20, 2015, and designating the United States, which claims benefit to United Kingdom Patent Application 1418569.8, United Kingdom Patent Application 1418571.4 and United Kingdom Patent Application 1418573.0, all filed on filed on Oct. 20, 2014. The entire content of these applications is incorporated herein by reference.

FIELD OF THE INVENTION

This invention relates to methods and systems for generating alternative routes, and also extends to navigation devices and servers arranged to generate alternative routes. The present invention also extends to methods and systems for determining a route taken by a user at a decision point in a navigable network, and to methods and systems for providing information to a user regarding alternative routes through a navigable network. Illustrative embodiments of the invention relate to portable navigation devices (so-called PNDs), in particular PNDs that include navigation satellite signal reception and processing functionality. Other embodiments relate, more generally, to any type of processing device that is configured to execute navigation software so as to provide, for example, route planning functionality and/or navigation functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

When navigating along a route, or planning a route, users may be presented with alternative routes between an origin and destination by a navigation device, or other system having route generating functionality. Rather than simply providing the user with a single route optimised with respect to time, distance or another criterion such as fuel economy, this provides the user with the opportunity to decide which of a number of possible routes they prefer for some reason. These routes would typically not be optimised with respect to the given criterion, e.g. time, but might be preferable to a user for another reason, e.g. in that they avoid a particular junction or stretch of road that the user dislikes, are more scenic, etc.

Generating and selecting alternative routes which are sensible routes a user might wish to use presents some challenges. It will be appreciated that numerous routes could theoretically be provided which differ in some respect from a first, e.g. fastest, route. In particular, in order to provide more useful alternative routes that are more likely to be helpful to a user, it is desirable for the alternative routes to differ to an appropriate degree from the first, e.g. fastest, route.

Some prior art techniques for generating an alternative to a main route between an origin and a destination have involved blocking off a central portion of the main route, such that the segments forming this part of the route may not be considered in a route planning process for generating the alternative route. However, preventing overlap between significant portions of the main and alternative routes in this way may force alternative routes to deviate significantly from the main route, and include inappropriate detours. An example of one such set of alternative routes is shown in FIG. 6.

Certain techniques have been proposed to try to ensure that the alternative routes generated are sensible, i.e. user friendly alternatives, e.g. by consideration of the degree of permissible overlap, etc. Some such techniques have been developed as part of a project funded by the European Commission entitled "eCO-friendly urban Multi-modal route PlAnning Services for mobile uSers", or eCOMPASS, and are described, for example, under section 5 of the document entitled "FP7—Information and communication technologies: Grant Agreement No. 288094: D2.3.2—Validation and empirical assessment of algorithms for eco-friendly vehicle routing: Workpackage WP2—Algorithms for Vehicle Routing" available at http://www.ecompass-project.eu/sites/default/files/eCOMPASS-Deliverable-D2.3.2-v1.4.pdf. Further descriptions of the techniques for generating alternative routes can be found in the document entitled "Improved Alternative Route Planning" by Andreas Paraskevopoulos and Christos Zaroliagis, ATMOS 2013—13$^{th}$ Workshop on Algorithmic Approaches for Transportation Modelling, Optimization, and Systems, 10.4230/OA-SIcs.ATMOS.2013.108 available at http://drops.dagstuhl.de/opus/volltexte/2013/4248/pdf/10.pdf. The content of both these applications is incorporated herein by reference. In these techniques, rather than simply blocking a middle portion of a route when generating an alternative route thereto, a network of overlapping alternative routes is provided between an origin and destination, whose segments may join one another or split from one another, etc. An example of one such set of routes is shown in FIG. 7.

The Applicant has realised that there remains a need for improved methods and systems for providing a user with alternative route options during travel. The present invention, in some aspects, may provide methods and systems for generating alternative routes. In accordance with some further aspects, the present invention may provide methods and systems for determining routes taken by a user through a navigable network where alternative route options exist. In accordance with further aspects, the present invention may provide more efficient and improved methods for providing alternative route options to a user.

SUMMARY OF THE INVENTION

In accordance with a first aspect of the invention there is provided a method of generating routes through a navigable network, the navigable network being represented by an electronic map comprising a plurality of segments representing navigable elements of the navigable network, the segments being connected by nodes, the method comprising:

defining a sub-network of the navigable network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network;

generating a main route between an origin and a destination of a second origin-destination pair; and identifying a first decision point of the sub-network to be encountered along the main route, and generating an alternative route between the decision point and the destination of the second origin-destination pair using a routing process in which at least a first segment of the portion of the main route outgoing from the node representative of the first decision point is blocked and in which the subset of segments representative of the sub-network are favoured.

In accordance with the invention, therefore, at least one alternative route to a destination of a second origin-destination pair is determined in relation to an upcoming decision point on a main route (also referred to herein as the "active route") being travelled from the origin to the destination (of the second origin-destination pair). The decision point is a decision point of a predefined sub-network of segments corresponding to segments of (alternative) routes between the origin and destination of a first origin-destination pair, and the generation of, at least, the alternative route favours the segments representative of the sub-network. By referring to data indicative of elements of a predefined sub-network in this way to identify a decision point in relation to which an alternative route is to be generated, and also in generating the alternative route, it has been found that useful alternative routes may be generated in a more efficient manner. The alternative routes may be generated only in relation to significant decision points, corresponding to decision points of the sub-network, providing greater processing efficiency, and avoiding overloading a user with information. By favouring the segments of the sub-network in generating the route, more appropriate routes may be generated. Furthermore, when generating the alternative route at a decision point, an outgoing segment of the existing main route is blocked. This may help to ensure that a useful alternative route is obtained, differing appreciably from the main route. The present invention may allow alternative routes to be obtained with greater data efficiency, making the methods particularly suitable for implementation by a mobile device, e.g. navigation device.

The present invention extends to a system for carrying out a method in accordance with any of the aspects or embodiments of the invention herein described.

In accordance with a second aspect of the invention there is provided a system for generating routes through a navigable network, the navigable network being represented by an electronic map comprising a plurality of segments representing navigable elements of the navigable network, the segments being connected by nodes, the system comprising:

means for defining a sub-network of the navigable network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network;

means for generating a main route between an origin and a destination of a second origin-destination pair; and means for identifying a first decision point of the sub-network to be encountered along the main route, and generating an alternative route between the decision point and the destination of the second origin-destination pair using a routing process in which at least a first segment of the portion of the main route outgoing from the node representative of the first decision point is blocked and in which the subset of segments representative of the sub-network are favoured.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The system of the present invention in any of its embodiments may be in the form of any suitable device, such as a navigation device. In general, the system of the present invention may be at least one processing device. The or a processing device may be a device of a mobile device, such as a navigation device, whether a portable navigation device (PND) or an integrated device, or may be a device of a server.

The method of the present invention is preferably implemented in the context of a navigation operation. Thus, the method is preferably carried out by a set of one or more processors of a device or system having route generating capability and/or navigation functionality, as required. For example, the methods may be implemented by a computer system, e.g. a desktop or laptop system, which does not have navigation functionality.

In preferred embodiments the method of the present invention in any of its aspects or embodiments is carried out using a mobile device, such as a navigation device, and the present invention extends to a mobile, e.g. navigation, device arranged to carry out the steps of the method of any of the aspects or embodiments of the invention. The navigation device may be a PND or an integrated, e.g. in-vehicle, device.

In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a system, e.g. processing device of a navigation device.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system e.g. processing device of a server.

Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

The term "segment" as used herein takes its usual meaning in the art. A segment may be a navigable element (or link) that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments. The nodes of the navigable network as represented by the electronic map data include nodes representative of nodes connecting segments of the navigable network in the real world, e.g. junctions, intersections, etc.

The nodes represented by the electronic map data may also include artificial nodes, which are not representative of nodes in the real world. For example, an artificial node may be added when a speed limit changes along a navigable element.

The method of the present invention relates to generating alternative routes through a navigable network represented by an electronic map, and within which a sub-network is defined. The sub-network is represented by a subset of the plurality of segments and nodes which represent segments and nodes of the navigable network. The segments of the sub-network correspond to segments of routes which define a network of intersecting routes through the navigable network between an origin and destination of a first origin-destination pair. The segments of the network of routes intersect with one another at nodes of the sub-network. The nodes of the sub-network include nodes indicative of decision points of the sub-network at which there are two or more outgoing segments. Thus, a decision point of the sub-network is a point at which segments of the sub-network diverge.

The segments of the sub-network may be identified as such in any suitable manner. For example, the electronic map data indicative of each segment of the sub-network may be associated with an indication that it belongs to the sub-network. Alternatively or additionally the method may comprise storing data indicative of the identity of each navigable segment that forms part of the sub-network, and using the stored data to identify the segments which form part of the sub-network and which are to be favoured when generating a route through the navigable network.

The sub-network is made up of segments of a network of routes through the navigable network between the origin and destination of a first origin-destination pair. By favouring these segments in determining the or each alternative route between a decision point or points along a main route and the destination of the second origin-destination pair, the route generation process will favour routes which correspond to at least portions of this network of routes, e.g. segments thereof. The network of routes therefore guides the route generation process, and helps to focus the search space.

In some embodiments the sub-network is defined by segments of a set of previously travelled routes through the navigable network between the origin and the destination of the first origin-destination pair. The sub-network may therefore be referred to as a personal network, and comprises routes previously travelled by the user. The personal network defining the sub-network may itself be defined by a subset of routes previously travelled by a user, i.e. a subset of a larger personal network which includes routes traveled between different origin destination pairs. The step of defining the sub-network may comprise using stored data indicative of routes previously traveled through the navigable network to obtain the network of routes between the origin and destination providing the sub-network. In these embodiments, the routes whose segments define the sub-network correspond to historic routes. The steps involved in obtaining a set of stored previously traveled routes may involve, for example, a navigation device storing positional data during travel along the routes.

In other embodiments the sub-network comprises segments of a set of a plurality of alternative routes generated, i.e. calculated, between the origin and the destination of the first origin-destination pair. The network of routes is thus a previously generated network of alternative routes between the origin and destination. The step of defining the subnetwork may therefore comprise generating a set of a plurality of alternative routes between the origin and destination to provide the network of routes through the navigable network whose segments define the sub-network.

It will be appreciated that the step of defining the sub-network may be carried out before, after or at the same time as the step of generating the main route between the origin and destination of the second origin-destination pair. The sub-network of the navigable network and the main route may be generated independently of one another, or one may be generated by reference to the other.

For example, and when the sub-network is preferably at least part of a personal network, the sub-network is typically defined between a first origin-destination pair, such as home and work, home and the gym, etc, before the main route is generated. This main route often being between a second origin-destination pair, such as an origin that is in a parking area close to the home location, or a point of interest, e.g. shop or store, close to the home location. This main route can be generated without favouring the segments of the subset of segments representative of the sub-network, and thus be a minimum cost, e.g. fastest, shortest, etc, route between the second origin-destination pair using any segments as desired of the electronic map. In some embodiments, the segments forming such a generated main route could even be added to the existing sub-network before the alternative route between the decision point and the destination of the second origin-destination pair is generated. In other embodiments, the main route can be generated favouring the segments of the subset of segments representative of the sub-network, such that the main route is effectively a minimum cost, e.g. fastest, shortest, etc, route through the sub-network.

Thus, in some embodiments, the sub-network may be defined without reference to the main route. The sub-network may then be defined before, after or even contemporaneously with generation of the main route. For example, this may be appropriate where the alternative routes of the sub-network are previously traveled routes. The origin and destination of the second origin-destination pair may or may not then differ from the origin and destination of the first origin-destination pair. In some embodiments in which the sub-network is defined before generation of the main route, the method may comprise the step of generating the main route by reference to the sub-network. The main route may be generated so as to favour the segments of the sub-network or may be a route through the sub-network i.e. including only segments of the sub-network. The main route may be a least cost route through the sub-network. In other embodiments the main route may be generated without reference to the sub-network. Where the main route generated is not confined to the sub-network, it may be added to the sub-network to extend the network.

In some embodiments, and when the sub-network is preferably a plurality of intersecting routes, the main route can be generated between the first origin-destination pair using an segments of the electronic map as desired. The main route can then be used, e.g. as a basis for the alternate route generation techniques developed in the eCOMPASS project, to generate the sub-network. Thus, in these embodiments, a main route is first calculated, and then used to define (or generate) the sub-network. it will also be appreciated that in such embodiments the first origin-destination pair will typically be the same as the second origin-destination pair.

Thus, in some embodiments the main route may be used in obtaining the sub-network of alternative routes. In some embodiments the method comprises the step of generating the main route between the origin and destination of the second origin-destination pair, and using the main route in generating a set of a plurality of alternative routes to the main route between the origin and destination, the set of a plurality of alternative routes providing the set of a plurality of alternative routes defining the sub-network. The main route may be generated taking into account all of the segments of the navigable network, or at least all of the segments to be considered for routing purposes, e.g. in a routing corridor, within a given area of the origin, etc. The main route may be any least cost route through the network, e.g. with respect to time, distance or fuel consumption, etc. In these embodiments the origin and destination of the first origin-destination pair are identical to the origin and destination of the second origin-destination pair.

Accordingly, it will be appreciated that the sub-network defined by the segments of alternative routes between the first origin-destination pair may be suitable for guiding generation of routes between a second origin-destination pair, where the origin and destination of the second origin-destination pair correspond to the origin and destination of the first origin-destination pair, or at least are in proximity thereto. The origin of the second origin-destination pair may be the same as, or similar to the origin of the first origin-destination pair. Likewise, the destination of the second origin-destination pair may be the same as, or similar to the destination of the first origin-destination pair. For example, the origin or the destination of the second origin-destination pair may be within a given proximity, e.g. 1 km of the corresponding one of the origin or the destination of the first origin-destination pair.

The origin and destination of the first and/or second origin-destination pair may be any suitable origin and destination, and may be obtained from any suitable source or sources. The origin and destination may be user specified or automatically selected, or combinations thereof. For example, the origin and/or destination may be received over a communications network. The origin and destination could be received by a server from a navigation device, or may be received by a navigation device from a server. The origin of the second origin-destination pair at least may correspond to a current position of a user.

The set of alternative routes defining the sub-network in embodiments in which the alternative routes are calculated routes, whether based on the main route or not, may be generated according to any suitable technique. In some embodiments the routes are generated based on a cost of traversing segments of the network of navigable segments. For example, the set of routes may include a least cost route (or at least a least cost route after a main route where already generated), and one or more next least cost routes. The cost is preferably based at least in part upon a traversal time or traversal speed for each segment. The traversal time or speed used in these embodiments may be an expected traversal time or speed based upon historical data. Various techniques may be used to try to ensure that the set of alternative routes are sensible, i.e. user friendly alternatives, e.g. by consideration of the degree of permissible overlap, etc. In some preferred embodiments, the set of routes are generated using the techniques developed as part of the eCOMPASS project referred to above.

However it is generated, whether based on personal routes, or other previously generated routes, the network of routes whose segments define the sub-network of the navigable network, is a fixed network of routes. The routes do not dynamically change, e.g. during travel of the user through the network, i.e. routes are not added, modified or deleted. Thus the sub-network can be thought of as a predefined or static sub-network.

The Applicant has realised that it is desirable to be able to provide the user with one or more alternative route options after travel has commenced along the main route. This may provide a more dynamic system, in which the user is provided with greater control over their journey. The present invention provides methods which enable such alternative route options to be generated more efficiently in respect of a decision point or points along a traveled route. As the alternative route(s) are generated during travel along the route, this enables live data e.g. indicative of applicable traffic conditions, weather conditions, etc. to be taken into account, rather than relying upon the predefined routes of the sub-network.

The method comprises the step of generating a main route between a second origin-destination pair. This may be carried out using a routing process which favours the segments of the sub-network in embodiments in which the sub-network is defined before generation of the main route. In some embodiments, at least one alternative route is also generated between the second origin-destination pair. This may then also be carried out using a routing process favouring segments of the sub-network if already defined. The step of generating the main route and, optionally, the at least one alternative route between the origin and the destination of the second origin-destination pair may be carried out before the user commences travel.

Preferably the step of generating the main route and, optionally, at least one alternative route between the origin and destination of the second origin-destination pair comprises using live data indicative of the traversal times or speeds of segments of the navigable network. Preferably such data is also used when generating the or each alternative route between a decision point and the destination of the second origin-destination pair. Live data as referred to herein may be thought of as data which is current, or at least relatively current, and provides an indication of what is occurring on a segment of the network. The live data may typically relate to the conditions on the segment within the last 15 minutes, 10 minutes, 5 minutes, or even more recently. In this way, the main and at least one alternative route may be generated taking into account, for example, current traffic conditions, weather conditions, etc on the network. Data indicative of live traversal times or speeds for segments may be obtained, for example, via a feed over a wireless communications channel as known in the art.

The main and, optionally, alternative routes between the origin and destination of the second origin-destination pair, and the or each alternative route between a decision point and the destination of the second origin-destination pair, may be generated in any suitable manner. The routes are preferably generated based upon a cost of traversing navigable segments of the navigable network. Thus the route generation (or routing) process used in generating the main and alternative routes is preferably based upon a cost of traversing the navigable segments of the network. The cost of traversing a navigable segment may be determined using a cost function. The cost of traversing a segment may be determined based upon one or more attributes associated with the segment. The cost of traversing a segment is preferably based at least in part upon a time to traverse the segment. Obtaining routes by reference to a traversal cost may be achieved using any known method, such one based on the Dijkstra method.

Preferably the main route between the origin and destination of the second origin-destination pair is a least cost route between the origin and the destination. The least cost route may be a fastest route, shortest route, most ecological etc, or any combination thereof as desired. A least cost route may be based upon minimising a cost associated with traversing segments of the navigable network, which cost is determined using an appropriate cost function, i.e. which results in a lower cost being associated with segments that have an attribute that is deemed particularly desirable, or a higher cost associated with segments that are deemed undesirable. For example, the cost function may be selected as appropriate, e.g. based upon user input, to result in a least cost route that is a shortest route, fastest route, most ecological route, etc. In some embodiments the main route is a least cost route through the sub-network. In embodiments in which one or more alternative route is generated between the origin and destination of the second origin-destination pair, the or each alternative route may be the next lowest cost route or routes between the origin and the destination after the main route. Thus the main route may be a least cost route between the origin and the destination, and the at least one alternative route may be the next least cost route or routes between the origin and destination. However, the alternative route or routes need not be the next least cost route(s). For example, other constraints may be imposed during the process of generating the alternative route(s), e.g. regarding degree of overlap to the main route, complexity, etc. Such constraints may include user specified preferences.

In accordance with some embodiments of the invention in which the sub-network is defined before generating the main route between the origin and the destination of the second origin-destination pair, the segments of the sub-network are favoured in generating the main route, and where applicable, alternative route(s). In accordance with all embodiments of the invention the segments of the sub-network are favoured when generating an alternative route between a decision point and the destination of the second origin-destination pair. Any of the features described in respect of generating a route favouring the segments of the sub-network between the origin and the destination of the second origin-destination pair herein are applicable equally when generating an alternative route between a decision point and the destination. Favouring the segments of the sub-network makes the segments more likely to be included in a route generated through the navigable network. By favouring the segments in this manner, rather than limiting the route generation process to using segments which form part of the sub-network, it is possible that a main or alternative route generated will include segments which do not form part of the sub-network. This may be the case where, for example, current traffic conditions mean that, despite the favouring of the segments, their cost is still greater than other segments of the network outside of the sub-network, and which are not affected by the traffic conditions. Thus, while the present invention is likely to provide alternative routes, and in some embodiments a main route, that are within the sub-network, the route planning process is provided with the flexibility to include segments outside of the sub-network if these may result in an overall more favourable, e.g. lower cost, route.

When an alternative route between a decision point and the destination of the second origin-destination pair is generated, and, in some embodiments the main and optionally at least one alternative route between the origin and destination of the second origin-destination pair, the segments of the sub-network are favoured as a result of their belonging to the sub-network. Although the segments of the subnetwork correspond to segments of a network of routes, in embodiments at least, the present invention merely favours segments by virtue of their forming part of the sub-network, and does not take into account the routes through the network of which they form part through the sub-network in the route generation process. Thus, the order of the segments within a given route of the network of routes defining the sub-network is immaterial.

The or each navigable segment may be favoured in any suitable manner for the purposes of route generation through the navigable network so that when a main or alternative route is generated, the or each segment is considered more favourable for inclusion, i.e. than it would otherwise be.

Preferably the generation of the routes between the origin and destination, or between a decision point and the destination, of the second origin-destination pair, is based upon a cost of traversing navigable segments of the navigable network. The method may then comprise favouring the or each navigable segment of the sub-network for the purposes of route generation by reducing a cost associated with the or each navigable segment. The cost associated with traversing a navigable segment may be determined using a cost function. In embodiments a cost reduction may be applied to the or each navigable segment of the sub-network using the cost function. For example, the method may comprise determining a cost associated with traversing navigable segments of the navigable network using a cost function that is arranged to apply an additional cost reduction to each navigable segment of the sub-network (e.g. only to the or each navigable segment of the sub-network) as a result of their forming part of the sub-network. The cost reduction may reduce the cost associated with traversing the segment relative to the cost that would otherwise be obtained for that segment based upon its attributes. The main route between the origin and destination of the second origin-destination pair, and the alternative route generated between a decision point and the destination of the second origin-destination pair in a process involving blocking an outgoing segment of the main route at the decision point are preferably least cost routes. Any additional alternative routes between a decision point and the destination may also be least cost routes based on blocking the first outgoing segment of the main route and any previously generated alternative route(s). The alternative route(s) between the origin and destination, typically will not be least cost routes, but may be, for example, next lowest cost routes.

Of course, it is envisaged that making the segments of the sub-network more favourable for the purposes of route generation might be achieved in other ways, e.g. by making segments which do not form part of the sub-network less favourable than they would otherwise be, e.g. through manipulation of the cost associated with each segment.

In embodiments in which a main route and at least one alternative route between the origin and destination of the second origin-destination pair are determined, the method may comprise outputting data indicative of the existence of the one or more routes to the user. The method may comprise displaying at least a portion of the main route and at least a portion of the or each alternative route between the origin and the destination of the second origin-destination pair to the user. For example, an overview of each route may be provided, indicative of the entire route between the origin and destination of the second origin-destination pair, or at least a portion thereof. The method may further comprise generating, and, in embodiments, providing navigation instructions to a user to guide the user along at least the main route. Navigation instructions as referred to herein may be in the form of a display of the route, typically in combination with a set of one or more instructions indicative of manoeuvres and other actions to be taken by the user to follow the route, which may be given audibly and/or visually. The method may comprise providing the user with comparative data for the main and the or each alternative route, e.g. indicative of a difference in estimated time of arrival, difference in distance, etc when taking the alternative route, etc.

The method further comprises identifying a first decision point of the sub-network which lies along the main route, i.e. the first decision point encountered when travelling from the origin of the second origin-destination pair along the main route. The first decision point is the next decision point of the sub-network that will be encountered during travel along the route. An alternative route is generated between the decision point and the destination of the second origin-destination pair using a routing process in which segments of the sub-network are favoured. This may be carried out in any of the manners described in relation to those embodiments of generating the main and optionally at least one alternative route between the origin and the destination in a manner which favours the segments of the sub-network, i.e. being based upon a cost of traversing segments.

In addition to favouring segments of the sub-network, at least the first segment of the continuation of the main route outgoing from the decision point is blocked for the purposes of route generation when generating the alternative route between the decision point and the destination of the second origin-destination pair. Thus the segment or segments is not merely penalised, but is prevented from being included in a route during the route generation process. In some embodiments only the first segment of the portion of the main route outgoing from the decision point is blocked. However, it is envisaged that one or more subsequent segments might also be blocked, in order to reduce potential overlap between the generated alternative route and the main route. The first segment of the portion of the main route outgoing from the decision point is the segment originating at the node representative of the decision point and extending along the main route in the direction toward the destination of the second origin-destination pair. By blocking the first segment of the main route extending from the decision point, the alternative route generated is forced to take the outgoing segment, or one of the other outgoing segments, at the decision point, such that any alternative routes generated to the destination will deviate from the main route at the decision point, providing an alternative path for the user at that point. The user may then be presented with the alternative and main routes at the decision point to enable them to make a decision as to which path to take.

As in certain embodiments of determining the main route between the origin and the destination of the second origin-destination pair, generation of the alternative route at the decision point will be guided by those segments forming part of the sub-network. For example, the alternative route at the decision point is preferably generated based on live data, e.g. indicative of current traversal times or speeds of segments of the network. Generation of the route in a manner that favours the segments of the sub-network will tend to bring the route back to the sub-network in the event that the main route has deviated therefrom.

The step of identifying the first decision point of the sub-network along the main route, and generating the alternative route between the decision point and the destination of the second origin-destination pair, may be carried out before travel commences along the main route, or during travel along the route. In some embodiments the step of generating the alternative route may be triggered as the user approaches the first decision point when travelling along the main route, e.g. when a current position of the user is within a predetermined distance of the first decision point. Whether or not the alternative route generation occurs before travel commences along the main route, by determining the alternative route at the decision point, the alternative may be presented to a user as the user approaches the decision point.

The method may comprise, for any decision point of the sub-network along a main route at which an alternative route to the destination of the second origin-destination pair is generated, additionally generating at least one further alternative route between the decision point and the destination using a routing process in which at least the first segment of the continuation of the main route and the or each already generated alternative route between the decision point and the destination of the second origin-destination pair outgoing from the decision point is blocked, and segments of the sub-network are favoured. Thus, in the same manner as the first alternative route between the decision point and the destination of the second origin-destination pair is determined through a process favouring the segments of the sub-network, and blocking at least the first outgoing segment at the decision point, this step may be repeated, this time additionally blocking at least the first segment of the or each already generated alternative route, e.g. the first alternative route, in order to provide an alternative route to the destination of the second origin-destination pair that differs from the main, and each other alternative route at the decision point.

As with the main route, once the or each alternative route between a decision point along the main route and the destination has been generated, the method may comprise outputting data indicative of the existence of the or each alternative route at the decision point to user. This may involve outputting any suitable information indicative of the main route and the or each alternative route to the user. Data indicative of the main route and at least one alternative route at a decision point may be output to the user when the current position of the user is within a predetermined distance of the decision point.

The decision point and the or each alternative route may be indicated by respective icons along the route. Alternatively or additionally, the method may comprise displaying the decision point, and at least a portion of the main route and at least a portion of the or each alternative route between the decision point and the destination of the second origin-destination pair to the user. The portion of the main route may include the current position. At least a portion of each route in the region of the decision point, e.g. emanating therefrom, may be output, e.g. from the current position to the destination. The representation may be selectable to obtain an overview of the route.

The method may comprise displaying a schematic representation of the main route together with an indication of the position of the decision point along the route, and an indication of the or each alternative route at the decision point to a user. In some embodiments the schematic representation of the route is a linear representation. The representation of the main route may be a representation of any portion of the route including a current position and the decision point, e.g. a portion of the route from the current position or origin of the second origin-destination pair to the decision point or destination of the second origin-destination pair. The representation may of a form as described in US 2007/0225902 A1 entitled "Navigation device displaying dynamic travel information" or WO 2008/083862 A1 entitled "Method of indicating traffic delays, computer program and navigation system therefor", the entire content of both documents being incorporated herein by reference, wherein the schematic representation is a linear representation extending from the origin of a planned route, or the current position of a navigation device along the planned route, to the destination of the planned route. In preferred embodiments, however, the representation may be of a form as described in WO 2014/060559 A1 entitled "Methods and systems of providing information using a navigation apparatus", the entire content of which is also incorporated herein by reference, wherein the schematic representation is a linear representation of a portion of a path to be followed. As will be appreciated, the schematic representation is not intended to provide an accurate path representation for use in navigation, but is to be used to facilitate visualization of the path to be travelled and to convey information relating to POI or events, e.g. traffic, accidents, hazards, speed cameras, danger zones, etc, or in this case alternate route options, relating to the path, e.g. by appropriately annotating the representation. In embodiments the method further comprises displaying a representation of a 2D or 3D navigation map simultaneously with displaying the linear representation of the portion of the path. The navigation map may provide a representation of a current position and an indication of a road on which the current position is located. The navigation map may provide an indication of the path to be taken from the current position to follow the route. The navigation map provides a representation of the actual surroundings to facilitate navigation. The displayed linear representation of the portion of the path and/or display window in which the representation is displayed may be located along a side of the displayed navigation map. The side may be a bottom or top edge or more preferably one of the side edges connecting the top and bottom edges of the map. In some embodiments the linear representation extends vertically along a side of the map. In some preferred embodiments the linear representation and/or window is provided superimposed on a background image of the 2D or 3D navigation map.

The method may comprise providing the user with comparative data for the main and the or each alternative route, e.g. indicative of a difference in estimated time of arrival and/or distance to be travelled and/or expected fuel consumption, when taking the alternative route, etc.

Data indicative of the main route, and optionally an alternative route between the origin and destination of the second origin-destination pair, or a decision point and the destination of the second origin-destination pair, is preferably output to a user via a mobile device. The mobile device may be associated with a vehicle in which the user is travelling, and is preferably a navigation device. The navigation device may be an integrated navigation device or a portable navigation device (PND), e.g. handheld device, associated with the vehicle. The device is preferably the same device which performs some or all of the steps of generating routes through the network in accordance with the invention. However it is envisaged that some or all of the route generation steps may be carried out by a remote device, e.g. a server, and transmitted to the device for output to a user.

It will be seen that the process of obtaining one or more alternative routes for the next decision point of the sub-network along a current main route may be repeated continually during progress along a main route to the destination of the second origin-destination pair, such that at least one alternative route may always be presented to a user in respect of an upcoming decision point of the sub-network.

The user may choose to continue on the main route after passing the decision point, or may opt to take the or a one of the generated alternative routes at the decision point. The method may comprise, when it is determined that a user has chosen to continue on the existing main route after passing the first decision point, identifying the next decision point of the sub-network along the main route, and generating an alternative route between the decision point and the destination of the second origin-destination pair using a routing process in which at least the first segment of the portion of the main route outgoing from the decision point is blocked and segments of the sub-network are favoured. Where it is determined that the user has chosen to take an alternative route at the first decision point, the alternative route may be taken as a new main route, and one or more alternative routes generated in respect of the next decision point of the network along the new main route.

These steps may be repeated for each "next" decision point of the sub-network to be encountered during travel of a user along a main route. It will be appreciated that the term "main route" refers to a current main route, i.e. the main route after passing a preceding decision point of the sub-network. Depending upon the decisions made by the user at each decision point of the sub-network along the route, an alternative route at a decision point may become the main route after passing through the decision point, if the user decides to take the alternative route, as described above. The main route may sometimes be referred to as the "active route", i.e. the route along which the user is currently travelling, and for which navigation instructions are provided.

In preferred embodiments the step of generating an alternative route between a decision point of the sub-network along the main route and the destination is carried out only in respect of the first, i.e. next, decision point of the sub-network along the main route ahead of a current position along the main route. As it is not certain whether the user will take the main route or an alternative route at a forthcoming decision point, there is typically little, if any, need in determining alternative routes in relation to subsequent decision points along the current main route at that stage. This may lead to unnecessary data processing and storage. Instead, it is more efficient to wait until the route taken by the user after passing through the next decision point is known. Thus, it is only necessary to look ahead to the next decision point of the sub-network along the current route to generate alternative route options. Once the decision point has been passed, the step of identifying the next decision point may be repeated, this time in relation to the main route followed after passing through the first decision point, and one or more alternative routes generated to the destination of the second origin-destination pair. Again, preferably this step is carried out only in relation to the next decision point.

While the invention has been described in relation to performing the steps of determining alternative routes in respect of a next decision point of the sub-network along a main route, it will be appreciated that the method need not be carried out in relation to each decision point of the sub-network along the route. For example, the method may be carried out in relation to only significant decision points, at which it is desired to provide users with alternative options. Thus the first decision point may not necessarily be the next decision point to be encountered, but instead be an upcoming decision point, and, in embodiments in which the method is repeated in respect of a further decision point after passing through the first decision point, the method may comprise performing the steps of the method in relation to a subsequent decision point, which may not necessarily be the next decision point along the main route.

Generating an alternative route in respect of a decision point along a main route, e.g. the first or a next decision point, may be triggered, e.g. by the current position of the user coming within a predetermined distance of the decision point, or by the user passing a preceding decision point. Preferably the step of generating an alternative route from a decision point of a main route to the destination is carried out during travel along the main route, e.g. when approaching the decision point.

In some cases, it may be determined that there are no further decision points, or less than a predetermined number of decision points, of the sub-network between a current location and the destination of the second origin-destination pair. In some such cases, e.g. where the distance to the destination exceeds a given distance, such that it is still desirable to provide alternative route options, the method may then comprise defining a new sub-network of alternative routes between the current position and the destination of the second origin-destination pair. The new sub-network may be based on previously traveled routes between the applicable locations, or may be generated by calculating alternative routes using any suitable processes as described in relation to the original sub-network. The first decision point of this new sub-network along the main route may then be identified, and an alternative route or routes to the destination generated, as described in relation to the first decision point of the original sub-network. This may be repeated for subsequent decision points of the sub-network until the destination is reached, or a further sub-network needs to be generated. It will be appreciated that each sub-network is a static sub-network, i.e. it does not change when new routes are generated. If the sub-network does not contain a decision point in the region required, rather than modifying the existing sub-network, a new sub-network is typically instead defined (or generated).

The method may comprise generating navigation instructions in respect of at least some, or each of the generated alternative routes at the first, or any subsequent decision point. The navigation instructions may be stored in association with the alternative route to which they relate. This may enable one of the alternative routes to be used as a main route, and guidance instructions output to a user, without further processing being required, if is determined that the user has taken the route.

Determining when a user has chosen to take an alternative route at a decision point (e.g. the first decision point or any subsequent decision point in relation to which the methods are carried out) may be carried out in various manners. In some cases the user may provide an input to indicate that they wish to take the alternative route. The step of determining when a user has chosen to take an alternative route may then comprise detecting a user input indicative that the user wishes to take the alternative route. The user input may be provided before or after the user has taken the alternative route, but would typically be provided before the user reaches the decision point. In other embodiments, the method may comprise automatically detecting when a user takes an alternative route at a decision point. In these embodiments the route of the user is inferred without the user providing any indication of the route taken or to be taken. Such detection will be based upon the path of the user after passing through the decision point. These embodiments may be advantageous in that the user is not required to specifically indicate their intended route, e.g. by providing a manual input.

Determining that the user has taken an alternative route at a decision point may be carried out by reference to the current position of the user. The method may comprise inferring that a user has chosen an alternative route at a decision point when a current position of the user is determined to lie on a segment of the alternative route outgoing from the decision point rather than on a segment forming a continuation of the main route outgoing from the decision point after passing through the decision point. This determination may be made using appropriate map matching techniques, i.e. techniques for determining the position of a user relative to an electronic map from the absolute position of the user, e.g. as obtained from navigation satellite signals. The method may comprise then determining that the alternative route is the new main route.

In accordance with the invention in any of its aspects or embodiments, the current position of the user may be obtained using a device with positioning determining capability, such as GPS or GSM position determining capability. The device typically provides positional data associated with timing data, e.g. a timestamp. The device may be any mobile device, e.g. a navigation device whose position may be taken to correspond to the position of the user. The device may be associated with a vehicle in which the user is travelling, i.e. which is travelling between the origin and destination. The device may be an integrated navigation device or a portable navigation device (PND) associated with a vehicle. The device is preferably the same device that outputs data indicative of the main and alternative routes to the user. The device may be the same device which performs the route generation steps of the present invention, or which performs the steps of any of the further aspects of the invention.

Determining whether a current position of a user lies on a segment of an alternative route rather than a segment forming a continuation of the main route outgoing from a decision point (or the origin) may be carried out using any appropriate map matching technique, and may involve the use of various algorithms as known in the art. The method may comprise attempting to match data indicative of a current position to a position along one of the navigable segments of the electronic map. This may be carried out at different times during travel along the route to provide a continual estimation of the current position of the user as known in the art. The method may comprise attempting to match the current position of the user to a segment of the electronic map as the user travels between the origin and destination of the second origin-destination pair along the main route, and detecting when the current position may no longer be matched to a segment of the main route and instead lies on a segment of the alternative route outgoing from a decision point.

In some embodiments the method comprises, for the identified first decision point along the main route, storing data indicative of the or each generated alternative route and/or data indicative of the outgoing segment at the first decision point included in the route. The data is stored in one or more databases, which are referred to herein as a "route pool". In embodiments, the route pool comprises data indicative of a plurality of possible alternative routes that may be expected to be taken in the future. The method may further comprise generating navigation instructions for guiding a user along each route. The method may comprise storing the navigation instructions in association with the route to which they relate.

The method may comprise, when a current position of a user passes a decision point, determining whether a current position of the user can be matched to the outgoing segment at the decision point providing the continuation of the main route, and, if the current position can be matched to the outgoing segment, maintaining the existing main route as the main route to the destination, and, if the current position cannot be matched to the outgoing segment, determining whether the current position of the user can be matched to an outgoing segment at the decision point associated with a stored alternative route, wherein, when the current position can be matched to an outgoing segment at the decision point associated with a stored alternative route, the method comprises obtaining the stored alternative route, and taking the alternative route to be the new main route from the decision point to the destination.

In some cases, the user may deviate from any of the generated routes forming part of the route pool, i.e. the expected routes. In embodiments, when the current position cannot be matched to an outgoing segment at the decision point associated with one of the stored alternative routes, the method may comprise identifying the outgoing segment to which the current position can be matched, generating a route from the decision point to the destination along the identified segment, and using the generated route as the new main route to the destination. This step may be carried out in a manner that favours the segments of the sub-network.

The above steps may be repeated in respect of any further approaching decision point of the sub-network along a main route being traveled.

It is believed that obtaining and using a database or "route pool" of possible alternative routes at an upcoming decision point to automatically determine the route taken by a user is advantageous in its own right.

In accordance with a third aspect of the invention there is provided a method of determining a route taken by a user through a navigable network, the navigable network being represented by an electronic map comprising a plurality of segments representing navigable elements of the navigable network, the segments being connected by nodes, the method comprising:

identifying an upcoming decision point along a main route being travelled by a user between an origin and a destination, at which decision point there are a plurality of outgoing segments, and at which decision point there are one or more alternative routes to the destination, wherein each alternative route passes along a different one of the outgoing segments at the decision point than the outgoing segment providing a continuation of the main route;

storing, in at least one database, data indicative of each alternative route in association with data indicative of the outgoing segment at the decision point included in the route;

determining, when a current position of a user passes the decision point, whether a current position of the user can be matched to the outgoing segment at the decision point which provides the continuation of the main route, and, if the current position cannot be matched to the outgoing segment which provides the continuation of the main route, determining whether the current position of the user can be matched to an outgoing segment at the decision point associated with one of the stored alternative routes in the at least one database for the decision point, wherein, when the current position can be matched to an outgoing segment at the decision point associated with one of the stored alternative routes for the decision point, obtaining the data indicative of the stored alternative route, and taking the alternative route to be the new main route from the decision point to the destination, and wherein, when the current position cannot be matched to an outgoing segment at the decision point associated with one of the stored alternative routes for the decision point, identifying an outgoing segment to which the current position can be matched, generating a route from the decision point to the destination along the identified segment, and using the generated route as the new main route from the decision point to the destination.

The method may comprise identifying an upcoming decision point along a main route being traveled by a user between an origin and a destination, at which decision point there are a plurality of outgoing segments, and generating one or more alternative routes between the first decision point and the destination, wherein each alternative route passes along a different one of the outgoing segments at the decision point than the outgoing segment providing a continuation of the main route.

Additionally, or alternatively, if the current position can be matched to the outgoing segment, the method comprises maintaining the existing main route as the main route from the decision point to the destination.

The present invention extends to a system for carrying out a method in accordance with any of the aspects or embodiments of the invention herein described.

In accordance with a fourth aspect of the invention there is provided a system for determining a route taken by a user through a navigable network, the navigable network being represented by an electronic map comprising a plurality of segments representing navigable elements of the navigable network, the segments being connected by nodes, the system comprising:

means for identifying an upcoming decision point along a main route being traveled by a user between an origin and a destination, at which decision point there are a plurality of outgoing segments, and at which decision point there are one or more alternative routes to the destination, wherein each alternative route passes along a different one of the outgoing segments at the decision point than the outgoing segment providing a continuation of the main route;

means for storing, in at least one database, data indicative of each alternative route in association with data indicative of the outgoing segment at the decision point included in the route;

means for determining, when a current position of a user passes the decision point, whether a current position of the user can be matched to the outgoing segment at the decision point which provides the continuation of the main route, and, if the current position cannot be matched to the outgoing segment which provides the continuation of the main route, determining whether the current position of the user can be matched to an outgoing segment at the decision point associated with one of the stored alternative routes in the at least one database for the decision point, wherein, when the current position can be matched to an outgoing segment at the decision point associated with one of the stored alternative routes for the decision point, obtaining the data indicative of the stored alternative route, and taking the alternative route to be the new main route from the decision point to the destination, and wherein, when the current position cannot be matched to an outgoing segment at the decision point associated with one of the stored alternative routes for the decision point, identifying an outgoing segment to which the current position can be matched, generating a route from the decision point to the destination along the identified segment, and using the generated route as the new main route from the decision point to the destination.

The present invention in these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

As will be appreciated by those skilled in the art, these further aspects of the present invention can and preferably do include any one or more or all of the preferred and optional features of the invention described herein in respect of any of the other aspects of the invention, as appropriate. In particular the steps of the third and fourth aspects of the invention may be implemented in relation to the main and alternative routes determined at any decision point of the main route with the sub-network in accordance with the present invention in its first or second aspects in any of their embodiments. Furthermore, the invention in accordance with the third and fourth aspects of the invention in any of their embodiments may utilise main and alternative routes at a decision point that is a decision point of a sub-network, with the main and alternative routes being obtained in accordance with the first and second aspects of the invention in any of their embodiments. The origin and destination of the third and fourth aspects of the invention may correspond to the origin and destination of the second origin-destination pair of the first and second aspects.

The present invention in these further aspects and embodiments may be implemented by any suitable device, such as a navigation device. The system of the present invention may be such a device. In general, the system of the present invention may be at least one processing device. The or a processing device may be a device of a mobile device, such as a navigation device, whether a portable, e.g. handheld, navigation device or an integrated device, or may be a device of a server.

The method of the present invention in accordance with the third and fourth aspects is preferably implemented in the context of a navigation operation. Thus, the method is preferably carried out by a set of one or more processors of a device or system having navigation functionality. In preferred embodiments the method of the present invention in accordance with the third and fourth aspects in any of their embodiments is carried out using a navigation device, and the present invention extends to a navigation device arranged to carry out the steps of the method of any of the third and fourth aspects or embodiments of the invention. The navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention in these further aspects may be a system, e.g. processing device of a navigation device.

In other embodiments the method of the present invention accordance with any of the embodiments of the third and fourth aspects may be carried out by a server, and the present invention extends to a server arranged to carry out the steps of the method of any of the embodiments of the invention in its third and fourth aspects. The system of the present invention of any of its aspects or embodiments may be a system, e.g. processing device of a server.

Of course, the steps of the method of the present invention in any of the embodiments of the third and fourth aspects may be carried out in part by a server and in part by a navigation apparatus. The steps of the method may be performed exclusively on a server, or some on a server and the others on a navigation device in any combination, or exclusively on a navigation device. Thus, the system of the present invention may be provided in part by a navigation device or other mobile device, and in part by a server.

The present invention in accordance with the third and fourth aspects, and those embodiments of the first and second aspects including corresponding steps, involves storing data indicative of one or more alternative routes at an upcoming first decision point along a main route, the data indicative of each route being associated with data indicative of an outgoing segment at the decision point that forms part of the route. These routes are stored in one or more databases, that are referred to herein as a route pool, and are indicative of the expected alternative routes that may be taken by the user in the future. The decision point is an upcoming decision point along the main route, i.e. ahead of the current position. Data indicative of the main route, and the outgoing segment at the decision point included in the route, is also stored. This may or may not be stored in the route pool. The main route will already be stored as it is the currently traveled route.

The steps of obtaining the alternative route(s), and storing the data indicative of the outgoing segments and their associated routes is carried out during travel of a user along the main route. The steps may be triggered when a current position of a user is within a predetermined distance of the first decision point.

The main route may be any route currently being traveled between the origin and destination, and may be any suitable route, e.g. a minimum cost route between the origin and destination. The method may extend to the step of generating the main route. The or each alternative route may also be generated in any suitable manner. The main and each alternative route may be generated in the manner described in relation to the earlier aspects of the invention, e.g. by reference to a cost of traversing segments of the navigable network. Preferably live data is taken into account when generating each alternative route, e.g. live traversal time or speed data.

It will be appreciated that the methods of the invention in accordance with the third aspect may not be carried out in relation to every upcoming decision point along the main route. For example, the method may be carried out only in respect of decision points at which it is desired to present a user with alternative route options, e.g. significant decision points. Thus the first decision point may not be the next decision point along the main route. In some preferred embodiments the navigable network comprises a predefined sub-network, the sub-network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network. The decision point is preferably a decision point of the sub-network, and preferably a next decision point of the sub-network along the main route.

Whether or not the decision point is a decision point of a sub-network, in preferred embodiments the navigable network comprises a predefined sub-network, the sub-network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network, and the or each alternative route, and optionally the main route, is generated using a route generation process which favours the segments of the sub-network. This may be carried out in accordance with any of the embodiments earlier described.

In accordance with these aspects and embodiments of the invention, an outgoing segment corresponding to the continuation of the main route at the decision point is identified. One or more additional outgoing segments at the decision point are present. Each outgoing segment is a segment which emanates from the decision point. One or more alternative routes to the destination are generated, each route of which passes along a respective one of the outgoing segments at the decision point other than that forming the continuation of the main route, i.e. along the or an additional outgoing segment. Each alternative route passes along a different respective outgoing segment at the first decision point. In some embodiments only one alternative route is generated. The step of generating each alternative route may comprise blocking the outgoing segment of the main route from the decision point, and, where applicable, the or each outgoing segment at the decision point that forms part of an already generated alternative route. Such techniques may be in accordance with the first or second aspects of the invention. This will result in alternative routes passing along different outgoing segments at the decision point. In other arrangements it is envisaged that one or more outgoing segments other than that providing the continuation of the main route may be first identified, and an alternative route to the destination then generated along the or each segment.

However it is obtained, once each alternative route has been generated, data indicative of the alternative route is stored in the route pool in association with data indicative of the outgoing segment at the decision point included in the route. Data indicative of the continuation of the main route may be stored associated with data indicative of the outgoing segment forming part of that route. Such data may be stored in the route pool or elsewhere in another database. This enables a route including a particular outgoing segment at the decision point to be readily identified. The identity of an outgoing segment may be used to look up the associated route. The data may be associated in any manner, and it is envisaged that the identity of the outgoing segment forming part of a route may be stored as part of the route pool data, provided that it may be accessed for the purposes of the invention. Associating the outgoing segment data with the applicable route data in the route pool makes it possible to easily identify a route taken by a user by consideration of which segment of the network their current position can be matched to after passing through the decision point. The route data may be stored in any manner enabling it to be accessed and used in the remainder of the method. In embodiments the steps of obtaining the main and alternative route data is performed by a mobile device, e.g. a navigation device. The data may be stored in a memory of the device. Preferably a plurality of alternative routes are generated, and data in respect of each alternative route added to the route pool.

It will be appreciated that the alternative route along a particular outgoing segment that is stored in the route pool may be one of a plurality of alternative routes generated along the segment. The alternative route that is stored may be an alternative route that is optimised with respect to a given property, e.g. estimated time of arrival, length or fuel consumption.

In some embodiments a plurality of alternative routes is stored in the route pool, each being optimised with respect to a different given property, e.g. estimated time of arrival, length and fuel consumption. This may allow a user to be presented with a route that may suit their particular preferences. The route pool may contain only alternative routes that are optimised with respect to a given property. It will be appreciated that the existing main route may be the optimal route between the decision point and the destination with a given property. An optimised alternative route with respect to a given property will be the optimal alternative route for the property, e.g. a next most optimal route after the main route.

The stored data indicative of the alternative routes is stored in one or more databases, i.e. a route pool, comprising data indicative of alternative routes that are expected to be taken in the future, i.e. at the first decision point. The stored data may initiate the route pool, or update the route pool where the route pool has previously been initiated, e.g. in relation to an earlier decision point. The route pool is a dynamically changing database comprising, at any time, data indicative of one or more alternative routes which may be taken at an upcoming decision point along a currently traveled main route. Such data will naturally change, as the identity of the upcoming decision point, and the main route, changes. The route pool therefore comprises route data which is different at different times during travel along a route to the destination, e.g. being different at a first time when a first decision point is approached than at a subsequent time after passing the first decision point, and when a subsequent decision point is approached. Preferably the route pool comprises such data in respect of only one upcoming decision point at a given time. The decision point may be the next decision point to be encountered, or at least the next significant decision point in respect of which it is desired to be able to provide alternative route information. In some embodiments the first decision point is the next decision point of a sub-network to be encountered as previously described. Once the first decision point has been passed, and the main route of the user after passing the decision point determined, the route pool data for the first decision point is no longer required, and may be deleted. Preferably the route pool does not comprise data in respect of any previously passed decision point.

Preferably the method comprises the step of generating navigation instructions in respect of at least some, and preferably each generated alternative route at the first decision point. The navigation instructions are stored in association with the respective route(s), and may be stored in the route pool. This enables an alternative route to be used as a main route without further processing to generate navigation instructions, if the route is taken by the user.

The method may involve matching a current position of a user to a segment of the main route during travel along the main route from the origin to the destination, the segment being an incoming segment to the first decision point.

In these further aspects of the invention, the current position of the user may be obtained in any of the manners described in relation to the earlier aspects, by using a device with positioning determining capability, such as GPS or GSM position determining capability. The device typically provides positional data associated with timing data, e.g. a timestamp. The device may be any mobile device, e.g. a navigation device whose position may be taken to correspond to the position of the user. The device may be associated with a vehicle in which the user is travelling, i.e. which is travelling between the origin and destination. The device may be an integrated navigation device or a portable navigation device (PND) associated with a vehicle. Determining a segment upon which the current position lies may be carried out using any appropriate map matching technique, and may involve the use of various algorithms as known in the art. This may be carried out at different times during travel along the route to provide a continual estimation of the current position of the user as known in the art.

The method may comprise providing navigation instructions to the user for guiding the user along the main route.

The method may comprise outputting data indicative of the existence of at least some, or the or each alternative route at the first decision point to user. This may involve outputting any suitable information indicative of the main route and the or each alternative route to the user. The method may comprise displaying a schematic representation of the main route together with an indication of the position of the first decision point along the route, and an indication of the or each alternative route at the decision point to a user, e.g. as described above. In some embodiments the schematic representation of the route is a linear representation. The representation of the main route may be a representation of any portion of the route including a current position and the decision point, e.g. a portion of the route from the current position or origin to the decision point or destination. The decision point and the or each alternative route may be indicated by respective icons along the route. Alternatively or additionally, the method may comprise displaying the decision point, and at least a portion of the main route and at least a portion of the or each alternative route between the decision point and the destination to the user. The portion of the main route may include the current position. At least a portion of each route in the region of the decision point, e.g. emanating therefrom, may be output, e.g. from the current position to the destination. The representation may be selectable to obtain an overview of the route. The method may comprise providing the user with comparative data for the main and the or each alternative route, e.g. indicative of a difference in estimated time of arrival, distance, fuel consumption, etc, when taking the alternative route. Data indicative of the main route and at least one alternative route at a decision point may be output to the user when the current position of the user is within a predetermined distance of the decision point. Outputting data indicative of the main and alternative route(s) may be carried out in accordance with any of the techniques described in relation to the earlier aspects of the invention, and provides the user with information to enable them to make a decision as to which route to take at the upcoming first decision point. The data may be output by a mobile device, e.g. navigation device, which may be the same device which performs some or all of the other steps accordance with the third and fourth aspects of the invention.

When a current position of the user passes the first decision point, various steps are performed to establish the route taken by the user.

It is determined whether the current position of the user may be matched to the outgoing segment at the first decision point providing the continuation of the main route. When the segment of the navigable network to which the current position is matched after passing through the first decision point is a segment of the main route, it may be assumed that the user has continued along the main route. The existing main route continues to be treated as the main route after the user passes through the first decision point.

When the current position cannot be matched to the outgoing segment providing the continuation of the main route at the first decision point, it is determined whether the current position can be matched to an outgoing segment at the first decision point associated with one of the stored alternative routes obtained in respect of the first decision point. This may be carried out by comparing an identifier of the segment to which the current position is matched to the or each identifier of an outgoing segment associated with an alternative routes for which route data is stored. Where the current position can be matched to an outgoing segment associated with a stored alternative route obtained in respect of the first decision point, the stored alternative route is taken as a new main route to the destination. When the current position cannot be matched to a segment associated with a stored alternative routes obtained in respect of the first decision point, a further alternative route is generated from the first decision point to the destination along the segment. The generated route is taken to be the new main route to the destination. The route may be generated in any suitable manner, as described in relation to the previously generated stored routes. The route may be generated in a manner that favours segments of a sub-network of the navigable network where defined.

Performing the above steps, i.e. determining whether the current position of the user may be matched to a particular segment, may be carried out in any suitable manner. The method may comprise matching the current position to an outgoing segment at the first decision point, and comparing the identity of the segment to the identity of the segment forming the continuation of the main route, and, if appropriate, the identity of a segment or segments included in a stored alternative route or routes.

In this way, the path taken by the user at the first decision point may be detected from the current position of the user after passing the decision point, and an appropriate main route after passing the decision point established. If the user chooses to take a route that does not correspond to the existing main route, or an already generated alternative route, a new (alternative) route may be generated starting from the segment which has been taken, and becomes the new main route after passing through the first decision point. The route taken by the user at the first decision point is inferred without the need for the user to provide an input indicative of an intended route.

The method may comprise providing navigation instructions to the user for guiding the user along the main route determined after passing through the first decision point. Thus, this may be a continuation of the existing main route, a previously stored alternative route, or a new alternative route. This may utilise navigation instructions previously generated e.g. when the alternative route was generated if appropriate.

Preferably the method comprises deleting the stored route pool data indicative of the or each expected alternative route at the first decision point, i.e. the data indicative of the outgoing segment(s) at the decision point, and the associated one or more alternative routes, after the current position passes the first decision point. This data is no longer required once the route of the user after passing through the first decision point has been established, and may be replaced by corresponding data in respect of a new upcoming decision point. In other words, the route pool data may be refreshed.

It will be appreciated that the method of the third and fourth aspects of the invention, and the related embodiments, may be repeated for one or more subsequent decision points along the main route determined after passing through the first decision point. Such decision point(s) may not be the next (and if applicable, consecutive) further decision points. As described earlier, the techniques may be applied to only selected decision points along the route. In some embodiments, the method is carried out in relation to at least a next decision point along the main route that is a decision point of a sub-network of the navigable network. The method may be carried out in relation to each successive upcoming decision point of the sub-network along a main route until the destination is reached. The steps carried out in relation to any subsequent decision point may be carried out in accordance with any of the embodiments described in relation to the first decision point.

In preferred embodiments the method further comprises (and the system comprises means for) identifying an upcoming second decision point along the main route determined to be travelled by a user after passing through the first decision point, and generating one or more alternative routes between the second decision point and the destination, wherein each alternative route passes along a different one of the outgoing segments at the second decision point than the outgoing segment providing the continuation of the main route, and storing, in the at least one database (e.g. route pool), data indicative of each generated alternative route at the second decision point associated with data indicative of the outgoing segment at the second decision point included in the route.

When a current position of a user passes the second decision point, the method may comprise determining whether a current position of the user can be matched to the outgoing segment at the second decision point providing the continuation of the main route, and, if the current position can be matched to the outgoing segment, maintaining the existing main route as the main route to the destination, and, if the current position cannot be matched to the outgoing segment, determining whether the current position of the user can be matched to an outgoing segment at the second decision point associated with one of the stored alternative routes for the second decision point, wherein, when the current position can be matched to an outgoing segment at the second decision point associated with one of the stored routes, the method comprises obtaining the stored alternative route, and taking the alternative route to be the new main route from the second decision point to the destination, and, when the current position cannot be matched to an outgoing segment at the decision point associated with one of the stored alternative routes for the second decision point, identifying an outgoing segment to which the current position can be matched, generating a further route from the second decision point to the destination along the identified segment, and using the generated route as the new main route to the destination.

The method may comprise using the data stored in the route pool in respect of the possible alternative routes at the second decision point to replace the corresponding data obtained in respect of the first decision point, i.e. the data indicative of each generated alternative route, and the data indicative the outgoing segment at the second decision point included in each route.

The method may then be repeated for an upcoming third decision point along the main route determined after passing through the second decision point, and so on. The route data obtained for each subsequent decision point may be used to update the route pool data, e.g. to replace the corresponding data obtained for the previous decision point. As outlined above, the first, second, etc decision points need not be consecutive decision points encountered along the main route. However, preferably the network comprises a pre-defined sub-network, e.g. as described above, and the method is preferably carried out in respect of consecutive decision points of the sub-network along the main route. The first and second, and where applicable third, etc, decision points are preferably successive decision points of the sub-network along the main route.

The method may comprise generating navigation instructions for guiding a user along each alternative route generated, or at least some of the routes, in respect of a given decision point, and may comprise storing such data as described in relation to the first decision point.

The method may comprise obtaining and storing data indicative of one or more properties of the or each alternative route obtained in respect of a decision point (whether the first decision point, or a subsequent decision point), and optionally the main route. The data may be stored in the route pool. The properties may include one or more of an estimated time of arrival at the destination along the route, a distance to the destination along the route, a traffic condition on the route, and a fuel consumption when taking the route to the destination. The properties preferably include one or more dynamically changing properties, such as one or more of an estimated time of arrival at the destination along the route, a traffic condition on the route, and a fuel consumption when taking the route to the destination. The method may comprise dynamically updating the stored data indicative of the one or more dynamically changing properties during travel along the main route. For example, the data indicative of the dynamically changing properties may be updated at a given time interval as the user travels along the main route. The method may comprise providing the stored data, or data derived therefrom, to a user. For example, an indication of a route on a display of the navigation device can comprise an icon representative that there is traffic on the route.

In some embodiments each alternative route is an alternative route from the decision point to the destination that is an optimal alternative route with respect to a given property. The property may be estimated time of arrival, distance or fuel consumption. Different routes may be optimised with respect to different properties. This may enable the user to be presented with a route which is optimised with respect to one of a plurality of different properties which may be of interest. The method may comprise selecting one or more alternative routes at a decision point from the route pool for suggestion to a user based on the property data, and preferably data indicative of a dynamically changing property or properties of the routes. For example, an alternative route that is the most optimal from among a plurality of alternative routes stored in the route pool with respect to at least one property, e.g. time, distance or fuel consumption may be suggested.

In some embodiments the method may comprise determining when a parameter indicative of a dynamically changing property of an alternative route between a decision point and the destination (whether the first decision point or any subsequent decision point) changes by more than a predetermined threshold amount (i.e. during travel along the main route), and, when such a change is determined, repeating the steps of obtaining one or more alternative route from the decision point to the destination, wherein each alternative route passes along a respective one of the outgoing segments at the decision point other than the outgoing segment providing the continuation of the main route, and storing the data indicative of the or each alternative route in association with data indicative of the outgoing segment at the decision point included in the route in the route pool. The parameter to which the change relates may be, for example, an estimated time of arrival when taking the route, a fuel consumption of the route, etc. The data indicative of the one or more newly generated alternative routes is preferably used to replace the corresponding data stored in the route pool relating to one or more, and preferably each one of the existing generated alternative routes. The method therefore preferably comprises using the new alternative route data to replace the corresponding existing data in the route pool. The existing alternative route data is preferably deleted. In other words, in addition to refreshing the route pool when a decision point has been passed, the route pool may be updated if a dynamically changing property of a route changes by more than a given amount. This may suggest that, e.g. due to current traffic conditions, the route is no longer optimal, e.g. with respect to duration, and that a new set of alternative routes needs to be generated based on current conditions. This may help to ensure that the route pool always contains data indicative of alternative routes that may be considered optimal with respect to a given property or properties.

It will be appreciated that by providing and updating a route pool as described in relation to the third and fourth aspects of the invention comprising possible routes that may be taken by a user at an upcoming decision point, the system will always have data indicative of possible alternative routes from the upcoming decision point to the destination, and which may be presented to a user. While the storing of such route pool data is particularly useful in providing data enabling a path of a user taken at the decision point to be automatically inferred, the creation of a route pool is advantageous in other contexts, such as providing a selection of routes in relation to an upcoming decision point which may be presented to a user for manual selection of an intended route by the user.

In accordance with a fifth aspect of the invention there is provided a method of providing data indicative of route options to a user travelling through a navigable network, the navigable network being represented by an electronic map comprising a plurality of segments representing navigable elements of the navigable network, the segments being connected by nodes, the method comprising;

identifying an upcoming decision point along a main route being traveled by a user between an origin and a destination, at which decision point there are a plurality of outgoing segments, and generating at least one alternative route between the first decision point and the destination;

storing, in at least one database, data indicative of the at least one generated alternative route to the destination at the decision point;

displaying a schematic representation of at least a portion of the main route to the user, the representation comprising an icon indicative of a current position of the user along the main route, an icon indicative of the position of the decision point along the main route, and a selectable icon indicative of the existence of the at least one generated alternative route; and displaying, when selection of the icon by a user is detected, a representation on a map of at least portions of the main route and the alternative route extending from the decision point to the destination, wherein the representations of the main route and the alternative route are each selectable by a user to provide an indication of the route intended to be taken at the decision point;

wherein, when it is determined that the user has selected the representation of the main route, continuing to provide navigation instructions to the user to guide the user along the existing main route, and wherein, when it is determined that the user has selected the representation of the alternative route, taking the alternative route as the new main route from the decision point to the destination, and providing navigation instructions to the user to guide the user along the new main route.

The present invention extends to a system for carrying out a method in accordance with any of the aspects or embodiments of the invention herein described.

In accordance with a sixth aspect of the invention there is provided a system for providing data indicative of route options to a user travelling through a navigable network, the navigable network being represented by an electronic map comprising a plurality of segments representing navigable elements of the navigable network, the segments being connected by nodes, the method comprising;

means for identifying an upcoming decision point along a main route being traveled by a user between an origin and a destination, at which decision point there are a plurality of outgoing segments, and generating at least one alternative route between the first decision point and the destination;

means for storing, in at least one database, data indicative of the at least one generated alternative route to the destination at the decision point;

means for displaying a schematic representation of at least a portion of the main route to the user, the representation comprising an icon indicative of a current position of the user along the main route, an icon indicative of the position of the decision point along the main route, and a selectable icon indicative of the existence of the at least one generated alternative route; and means for displaying, when selection of the icon by a user is detected, a representation on a map of at least portions of the main route and the alternative route extending from the decision point to the destination, wherein the representations of the main route and the alternative route are each selectable by a user to provide an indication of the route intended to be taken at the decision point;

wherein, when it is determined that the user has selected the representation of the main route, continuing to provide navigation instructions to the user to guide the user along the existing main route, and wherein, when it is determined that the user has selected the representation of the alternative route, taking the alternative route as the new main route from the decision point to the destination, and providing navigation instructions to the user to guide the user along the new main route.

The present invention in these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

As will be appreciated by those skilled in the art, these further aspects of the present invention can and preferably do include any one or more or all of the preferred and optional features of the invention described herein in respect of any of the other aspects of the invention, as appropriate. In particular the steps of the fifth and sixth aspects of the invention may be implemented in relation to the main and alternative routes determined at any decision point of the main route with the sub-network in accordance with the present invention in its first or second aspects in any of their embodiments. Furthermore, the invention in accordance with the fifth and sixth aspects of the invention in any of their embodiments may utilise main and alternative routes at a decision point that is a decision point of a sub-network, with the main and alternative routes being obtained in accordance with the first and second aspects of the invention in any of their embodiments. In addition, the route pool may be obtained using any of the methods described in relation to the third and fourth aspects of the invention.

The present invention in these further aspects and embodiments may be implemented by any suitable device, such as a navigation device. The system of the present invention may be such a device. In general, the system of the present invention may be at least one processing device. The or a processing device may be a device of a mobile device, such as a navigation device, whether a portable, e.g. handheld, navigation device or an integrated device, or may be a device of a server.

The method of the present invention in accordance with the fifth and sixth aspects is preferably implemented in the context of a navigation operation. Thus, the method is preferably carried out by a set of one or more processors of a device or system having navigation functionality. In preferred embodiments the method of the present invention in accordance with the fifth and sixth aspects in any of their embodiments is carried out using a navigation device, and the present invention extends to a navigation device arranged to carry out the steps of the method of any of the fifth and sixth aspects or embodiments of the invention. The navigation device is a mobile device, and may be a PND or an integrated, e.g. in-vehicle, device. The navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention in these further aspects may be a system, e.g. processing device of a navigation device.

The present invention in accordance with the fifth and sixth aspects involves obtaining stored data indicative of one or more alternative routes at an upcoming first decision point along a main route currently being traveled. The first decision point is an upcoming decision point along the main route, i.e. ahead of the current position.

The step of obtaining the alternative route(s), and storing the data indicative of routes, is carried out during travel of a user along the main route. The steps may be triggered when a current position of a user is within a predetermined distance of the first decision point. The step of displaying an icon indicative of an alternative route or routes at the first decision point may be triggered when the current position is within a predetermined distance of the first decision point.

The main route may be any route currently being traveled between the origin and destination, and may be any suitable route, e.g. a minimum cost route between the origin and destination. The method may extend to the step of generating the main route. The or each alternative route may be generated in any suitable manner. The main and each alternative route may be generated in the manner described in relation to the earlier aspects of the invention, e.g. by reference to a cost of traversing segments of the navigable network. Live data is preferably taken into account when generating the main and/or each alternative route, e.g. live traversal time or speed data for segments.

As with the third and fourth aspects of the invention, it will be appreciated that the methods of the invention in its fifth and sixth aspects may not be carried out in relation to every upcoming decision point along a main route. For example, the method may be carried out only in respect of decision points at which it is desired to present a user with alternative route options, e.g. significant decision points. Thus the first decision point may not be the next decision point along the main route. In some preferred embodiments the navigable network comprises a predefined sub-network, the sub-network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network. The decision point is preferably a decision point of the sub-network, and preferably a next decision point of the sub-network along the main route.

Whether or not the decision point is a decision point of a sub-network, in preferred embodiments the navigable network comprises a predefined sub-network, the sub-network comprising a network of intersecting routes through the navigable network between an origin and a destination of a first origin-destination pair, the sub-network being represented by a subset of segments of the electronic map, and wherein nodes at which there are two or more outgoing segments of the subset of segments are indicative of decision points of the sub-network, and the or each alternative route, and optionally the main route, is generated using a route generation process which favours the segments of the sub-network. This may be carried out in accordance with any of the embodiments earlier described in relation to the first and second aspects.

The method may comprise, as in the third and fourth aspects of the invention, identifying an outgoing segment corresponding to the continuation of the main route at the decision point. One or more additional outgoing segments at the decision point are present. Each outgoing segment is a segment which emanates from the decision point. One or more alternative route to the destination is generated, each of which routes passes along a respective one of the outgoing segments at the decision point other than that forming the continuation of the main route, i.e. along an additional outgoing segment. Each alternative route passes along a different respective outgoing segment. In some embodiments only one alternative route is generated. The step of generating each alternative route may comprise blocking the outgoing segment of the main route from the decision point, and, where applicable, the or each outgoing segment at the decision point that forms part of an already generated alternative route. This will result in alternative routes passing along different outgoing segments at the decision point. In other arrangements it is envisaged that one or more outgoing segments other than that providing the continuation of the main route may be first identified, and an alternative route to the destination then generated along the segment.

However they are obtained, once each alternative route has been generated, data indicative of each alternative route is stored in at least one database or "route pool". Preferably a plurality of alternative routes are generated. The data may be stored in association with data indicative of the outgoing segment at the decision point included in the route as in the third and fourth aspects of the invention. Similarly data indicative of the continuation of the main route from the decision point to the destination may be stored, optionally associated with data indicative of the outgoing segment forming part of that route. Such data may be stored in the route pool or elsewhere.

It will be appreciated that the alternative route along a particular outgoing segment that is stored in the route pool may be one of a plurality of alternative routes generated along the segment. The alternative route that is stored may be an alternative route that is optimised with respect to a given property, e.g. estimated time of arrival, length or fuel consumption.

The method may comprise generating navigation instructions for guiding a user along each alternative route generated at a decision point, or at least some of the routes. This may be carried out for the first, or any subsequent decision point. The method may comprise storing the data, e.g. in the route pool. This may enable route instructions to be readily provided to a user, should the user take one of the alternative routes.

The route pool data may be stored in any manner enabling it to be accessed and used in the remainder of the method. In embodiments the steps of obtaining the main and alternative route data is performed by a mobile device, e.g. a navigation device. The data may be stored in a memory of the device. The device is preferably the device that performs the remainder of the method in its fifth and sixth aspects.

The route pool comprises data indicative of alternative routes that are expected to be taken in the future, i.e. at the first decision point. The stored data may initiate the route pool, or update the route pool where the route pool has previously been initiated, e.g. in relation to an earlier decision point. The route pool is a dynamically changing route pool comprising, at any time, data indicative of one or more alternative routes which may be taken at an upcoming decision point along a currently traveled main route. Such data will naturally change, as the identity of the upcoming decision point changes. The route pool therefore comprises route data which is different at different times during travel along a route to the destination, e.g. being different at a first time when a first decision point is approached than at a subsequent time after passing the first decision point, and when a subsequent decision point is approached. Preferably the route pool comprises such data in respect of only one upcoming decision point at a given time. The decision point may be the next decision point to be encountered, or at least the next significant decision point in respect of which it is desired to be able to provide alternative route information. In some embodiments the first decision point is the next decision point of a sub-network to be encountered as previously described. Once the first decision point has been passed, and the main route of the user after passing the decision point determined, the route pool data for the first decision point is no longer required, and may be deleted. Preferably the route pool does not comprise data in respect of any previously passed decision point. The dynamic alternative route data provided by the route pool is to be contrasted with the static alternative route data which may be provided by the sub-network of alternative routes used in accordance with certain embodiments of the invention.

The method may involve matching a current position of a user to a segment of the main route during travel along the main route from the origin to the destination, the segment being an incoming segment to the first decision point.

Preferably the method comprises deleting the stored route pool data indicative of the expected routes at the first decision point after the current position passes the first decision point, i.e. the data indicative of the outgoing segments at the decision point, and their associated routes.

This data is no longer required once the route of the user after passing through the first decision point has been established, and may be replaced by corresponding data in respect of a new upcoming decision point along the main route determined after passing the first decision point. In other words, the route pool data may be refreshed.

The method may comprise obtaining and storing data indicative of one or more properties of the or each alternative route obtained in respect of a decision point (whether the first decision point, or a subsequent decision point). The data may be stored in the route pool. The properties may include one or more of an estimated time of arrival at the destination along the route, a traffic condition on the route, and a fuel consumption when taking the route. The properties preferably include one or more dynamically changing properties. Such properties may include one or more of an include one or more of an estimated time of arrival at the destination along the route, a traffic condition on the route, and a fuel consumption when taking the route to the destination. The method may comprise dynamically updating the stored data indicative of the one or more dynamically changing properties during travel along the main route. For example, the data indicative of the dynamically changing properties may be updated at a given time interval as the user travels along the main route. This may enable data indicative of a given property to be output to a user at the appropriate time, if the route is selected for suggestion, or becomes the main route. The method may comprise providing the stored data, or data derived therefrom, to a user. For example, an indication of the stored data for an alternative route can be provided to the user in association with the selectable icon on the schematic representative of the main route.

In some embodiments the method may comprise determining when a parameter indicative of a dynamically changing property of an alternative route between a decision point and the destination (whether the first decision point or any subsequent decision point) changes by more than a predetermined threshold amount, i.e. during travel along the main route, and, when such a change is determined, repeating the steps of obtaining one or more alternative route from the decision point to the destination, and storing the data indicative of the or each alternative route in the route in the route pool. The alternative route(s) may be obtained in any of the manners described in relation to the original set of one or more alternative routes. It is believed that such embodiments are advantageous in their own right.

In accordance with a seventh aspect of the invention there is provided a method of providing data indicative of route options to a user travelling through a navigable network, the navigable network being represented by an electronic map comprising a plurality of segments representing navigable segments of the navigable network, the segments being connected by nodes, the method comprising:

identifying an upcoming decision point along a main route being travelled by a user between an origin and a destination, at which decision point there are a plurality of outgoing segments, and generating at least one alternative route between the decision point and the destination;

storing, in at least one database, data indicative of the at least one generated alternative route to the destination at the decision point;

obtaining and storing data indicative of at least one dynamically changing property of the at least one alternative route;

updating the stored data for the at least one alternative route during travel along the main route; and determining when the at least one property of the at least one alternative route changes by more than a predetermined amount, and, when such a change is determined, repeating the steps of generating at least one route between the decision point and the destination and storing data indicative of the at least one generated alternative route in the at least one database.

The present invention extends to a system for carrying out a method in accordance with any of the aspects or embodiments of the invention herein described.

In accordance with an eighth aspect of the present invention there is provided a system for providing data indicative of route options to a user travelling through a navigable network, the navigable network being represented by an electronic map comprising a plurality of segments representing navigable segments of the navigable network, the segments being connected by nodes, the system comprising:

means for identifying an upcoming decision point along a main route being traveled by a user between an origin and a destination, at which decision point there are a plurality of outgoing segments, and generating at least one alternative route between the decision point and the destination;

means for storing, in at least one database, data indicative of the at least one generated alternative route to the destination at the decision point;

means for obtaining and storing data indicative of at least one dynamically changing property of the at least one alternative route;

means for updating the stored data for the at least one alternative route during travel along the main route; and means for determining when the at least one property of the at least one alternative route changes by more than a predetermined amount, and, when such a change is determined, repeating the steps of generating at least one route between the decision point and the destination and storing data indicative of the at least one generated alternative route in the at least one database.

The present invention in accordance with these further aspects may comprise any of the features described with any of the other aspects of the invention, to the extent that they are not mutually inconsistent.

In accordance with the invention in any of its aspects or embodiments involving determining a change in a dynamically changing property of an alternative route, the changing property may be, for example, an estimated time of arrival or a fuel consumption when taking the route.

The data indicative of the one or more newly generated alternative routes is preferably used to replace the corresponding data stored in the at least one database or "route pool" relating to one or more, and preferably each one, of the existing generated alternative routes. The method therefore preferably comprises using the new alternative route data to replace the corresponding existing data in the route pool. The existing alternative route data is preferably deleted. In other words, in addition to refreshing the route pool when a decision point has been passed, the route pool may be updated if a dynamically changing property of a route changes by more than a given amount. This may suggest that, for example, due to current traffic conditions, the route is no longer optimal, e.g. with respect to duration, expected fuel consumption, etc, and that a new set of alternative routes needs to be generated based on current conditions. This may help to ensure that the route pool always contains data indicative of alternative routes that may be considered optimal with respect to a given property or properties.

The method of the fifth and sixth aspects comprises the step of displaying a schematic representation of at least a portion of the main route to the user as the user approaches the first decision point, the representation comprising an icon indicative of a current position of the user along the main route, an icon indicative of the position of the first decision point along the main route, and, for one or more, or each of said generated alternative routes, an icon indicative of the existence of the generated alternative route. Preferably an icon is provided indicative of the existence of only one alternative route at the decision point. The icons used herein may be any suitable graphical icon. An icon may comprise a single element or a group of elements. The icon indicative of the existence of the or each alternative route at the first decision point may be displayed when the current position is within a predetermined distance of the first decision point. Thus, the display of the icon may be triggered by the current position coming within the predetermined distance. It will be appreciated that an alternative route to be indicated to the user may be selected from a plurality of alternative routes generated for the first decision point in any suitable manner, e.g. based on a timing of the route, whether navigation instructions have been generated, etc.

In some embodiments the or each alternative route stored in the route pool is an alternative route from the decision point to the destination that is an optimal alternative route with respect to a given property. The property may be estimated time of arrival, distance or fuel consumption. Different routes may be optimised with respect to different properties. This may enable the user to be presented with a route which is optimised with respect to one of a plurality of different properties which may be of interest. The method may comprise selecting the one or more alternative routes in respect of which an icon is displayed to the user from the route pool based on the property data, and preferably data indicative of a dynamically changing property or properties of the route(s). For example, an alternative route that is the most optimal from among a plurality of alternative routes stored in the route pool with respect to at least one property, e.g. time, distance or fuel consumption may be suggested.

The method may comprise providing, e.g. displaying, to the user an indication of a property of the or each alternative route, optionally relative to the main route. The property may be a timing, length, traffic condition or fuel consumption of or associated with the route. The indication may be displayed associated with the schematic representation of the main route. The indication may be associated with the icon indicative of the existence of the alternative route to which it relates. The indication may comprise data indicative of an absolute value of the property, or a value or state of the property relative to the main route. In some embodiments the indication may merely be an indication of the existence of a difference relative to the main route, and the nature of the difference. For example, an indication may be provided that the route is faster or slower than the main route, e.g. by colouring the icon indicative of the alternative route appropriately. Such information may be displayed continually or intermittently. In some embodiments the property is a dynamically changing property, and the indication is based on a current value or state of the property.

In some embodiments the method may comprise displaying an icon indicative of a property of the or each alternative route. Such an icon may be associated with the schematic representation of the main route. The property may be selected from a timing, length or fuel consumption of the route. In some embodiments the property is a dynamically changing property, such as estimated time of arrival or fuel consumption when taking the route, or a traffic condition along the route. The property may be a property with which the route is optimised in relation to, e.g. in relation to which it is a minimum cost route. For example, the route may be a faster route, a shorter route, or a more economical route than the main route. The property may help the user to understand why the route is being brought to their attention. An icon indicative of a traffic condition may show that the alternative route is affected by traffic.

As discussed above, in preferred embodiments, the method comprises storing data indicative of one or more properties of the or each alternative route obtained in respect of a decision point and included in the route pool. Such data may be stored in the route pool. The data may then be used to enable the data indicative of a property of a route to be provided to the user. As discussed above, the method preferably comprises dynamically updating the stored data indicative of the one or more dynamically changing properties during travel along the main route. This may enable the property indication to be based upon the current state or value of the property and/or routes to be selected for output to a user based on the current state or value of the property. The or each icon indicative of the existence of an alternative route at the decision point is selectable by a user. When selection of an alternative route icon by a user is detected, the method comprises displaying representations on a map of at least those portions of the main route and the alternative route extending from the first decision point to the destination. The representations of the portions of the main route and alternative route are simultaneously displayed. The method may additionally comprise displaying a representation of a portion of the main route from the current position to the first decision point, and in some embodiments from the origin to the first decision point. The representation may comprise an icon indicative of the current position, an icon indicative of the location of the first decision point, and an icon indicative of the location of the destination.

It is envisaged that where icons indicative of a plurality of alternative routes are provided on the schematic representation of the main route, the user may be able to select multiple ones of the icons to result in selectable representations of a plurality of alternative routes being simultaneously displayed to the user on the map view together with the main route.

In preferred embodiments the method may comprise displaying comparative data for the main and the or each alternative route on the map. The data may include data indicative of a comparative timing for the routes e.g. an estimated time of arrival. This may be achieved using an icon associated with the representation of the applicable route, such as an icon indicating the time saving associated with the route for example. The method may comprise displaying data indicative of a duration of one or both (or each) route. In some embodiments the method comprises displaying data indicative of a duration for one, e.g. the main, route, and data indicative of the duration of the or each other, e.g. alternative, route relative thereto. Alternatively or additionally, comparative data relating to a length or fuel consumption of the route may be displayed in a similar manner to timing data.

The representations of each of the main and alternative route(s) are selectable by a user, e.g. manually. For example, the representations may be selectable by the user tapping the relevant representation.

When it is detected that the user has selected the representation of the main route, this is indicative that they wish to continue with the main route. The method may comprises continuing to provide navigation instructions for guiding the user along the existing route. Thus navigation instructions are output to the user for guiding the user along the continuation of the existing main route after passing through the first decision point.

When such an indication is received from the user, the method may comprise identifying a subsequent decision point along the main route at which there are a plurality of outgoing segments, generating one or more alternative route between the subsequent decision point and the destination, and storing data in the route pool indicative of each generated alternative route to the destination at the subsequent decision point. In other words, the steps performed in relation to the first decision point along the main route may be repeated, this time in relation to the subsequent decision point. These steps may be performed when the current position is within a predetermined distance of the subsequent decision point. The method may comprise using said stored data indicative of each generated alternative route to the destination at the subsequent decision point to replace the corresponding data determined for the first decision point along the main route in the route pool.

When it is detected that the user has selected the representation of the alternative route, indicating that they wish to take the alternative route, the method comprises taking the alternative route as the new main route. The method comprises outputting navigation instructions to the user for guiding the user along the new main route (i.e. the previous alternative route) after passing through the first decision point. The method may then comprise identifying an upcoming decision point along the new main route at which there are a plurality of outgoing segments, generating one or more alternative route between the decision point and the destination, and storing, in the route pool, data indicative of each generated alternative route to the destination at the upcoming decision point. These steps may be performed when the current position is within a predetermined distance of the upcoming decision point. The method may comprise using said stored data indicative of each generated alternative route to the destination at the upcoming decision point along the new main route to replace the corresponding data in the route pool determined for the first decision point along the previous main route.

As described above, and in relation to the third and fourth aspects of the invention, the route pool data may additionally be refreshed if a parameter associated with a dynamically changing property of one of the alternative routes determined for the first, or any subsequent decision point, changes by more than a predetermined threshold amount.

In these embodiments, the subsequent decision point along a main route which is a continuation of the existing main route, or an upcoming decision point along a new main route after passing through the first decision point may not necessarily be the next decision point. As described earlier, the techniques may be applied only to selected decision points along the route. In some embodiments, the method is carried out in relation to at least a next decision point along the (new) main route that is a decision point of a sub-network of the navigable network after passing through a first decision point that is a decision point of the sub-network.

It will be appreciated that the method of the fifth and sixth aspects of the invention, and the related embodiments, may be repeated for any desired number of further subsequent decision points along the main route determined after passing through a previous decision point until the destination is reached. Such decision point(s) may or may not be the next (and if applicable, consecutive) further decision points. In some embodiments in which the navigable network comprises a predefined sub-network, the method is carried out in relation to each successive upcoming decision point of the sub-network along a main route until the destination is reached. The route data obtained for each subsequent decision point may be used to update the route pool data, e.g. to replace the corresponding route data obtained for the previous decision point.

Where no selection of the main route or alternative route is received from the user, the method may comprise displaying a schematic, e.g. linear, representation of at least a portion of the main route to the user once more, together with the representations of the current position icon and alternative route icon(s). The system may then determine the path taken after the user passes through the decision point without requiring input by the user in accordance with the earlier described aspects of the invention, e.g. based on consideration of the route pool data.

It will be in accordance with the fifth and sixth aspects of the invention, the system will always have a main, and at least one alternative route which may be presented to a user in respect of an upcoming decision point along a current main route. This provides the user with the ability to participate more fully in the route selection process.

It will be appreciated that the alternative routes generated and used herein in accordance with any of the aspects of the invention may not be faster, or more advantageous than the main route. The invention is concerned with providing the user with at least one alternative route at decision points along a main route, to provide additional options the user might wish to consider, whether or not they are necessarily, for example, faster.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include navigation satellite, e.g. GPS (Global Positioning System) or GLONASS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying figures, in which:

FIGS. 11a and 11b illustrate some additional features that may be provided on the linear representation of the main route in accordance with the embodiment of FIG. 9, while

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
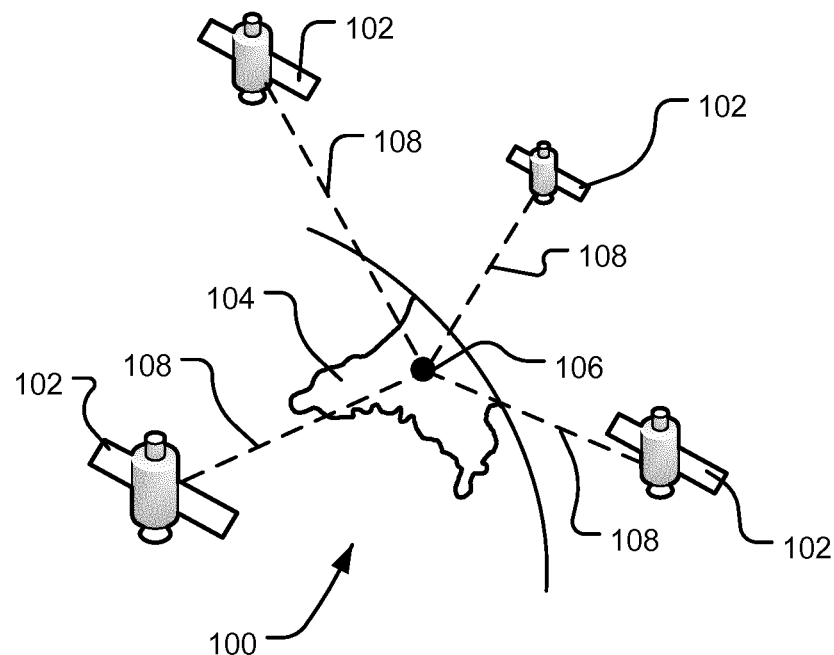
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
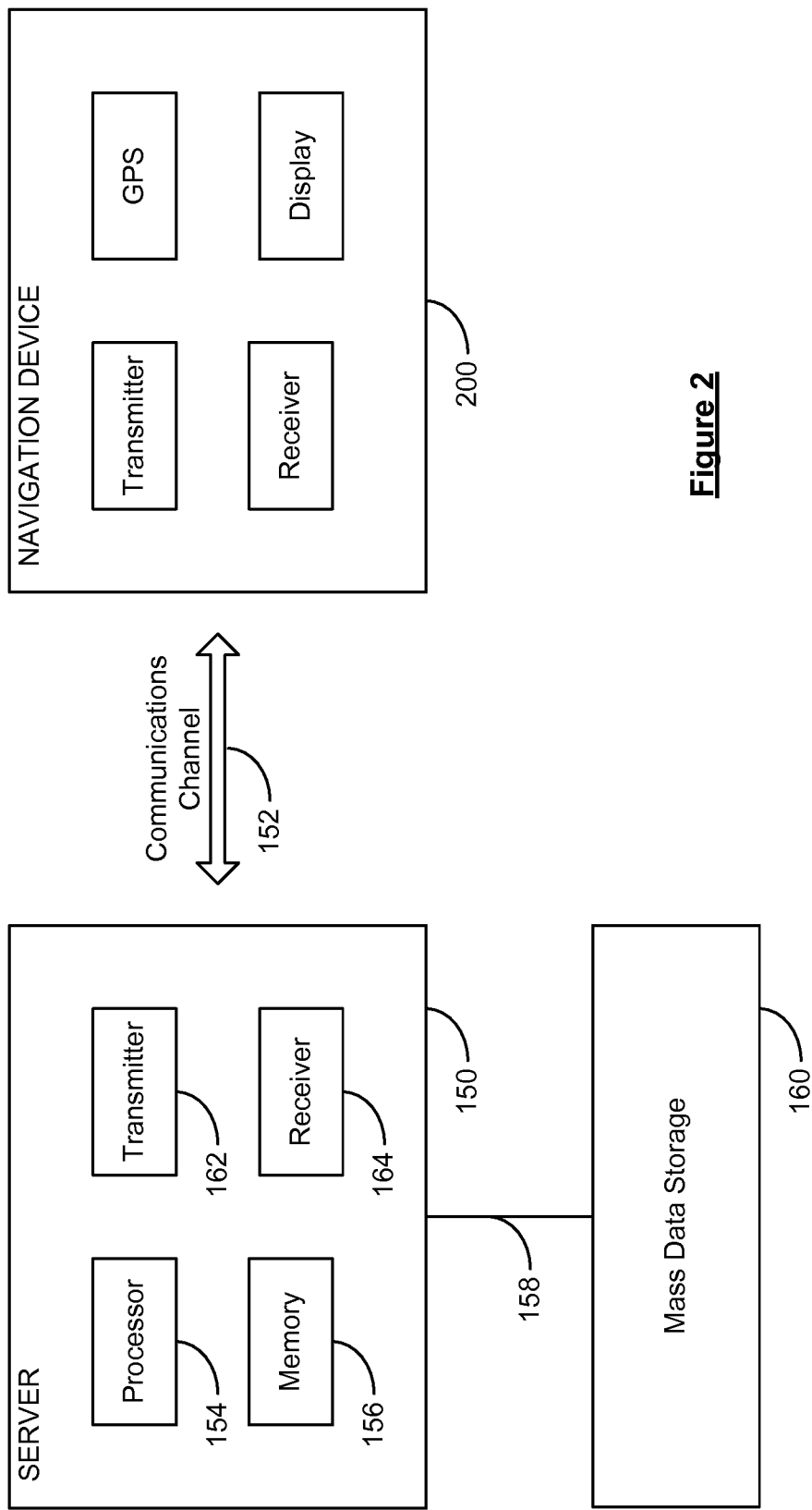
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
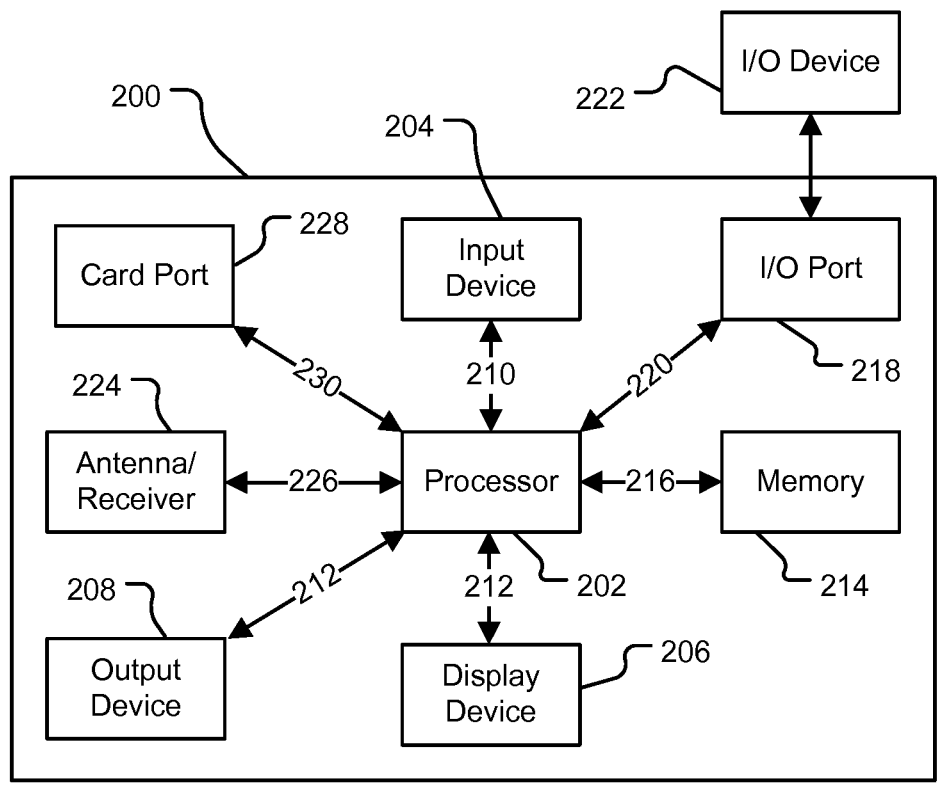
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectable to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
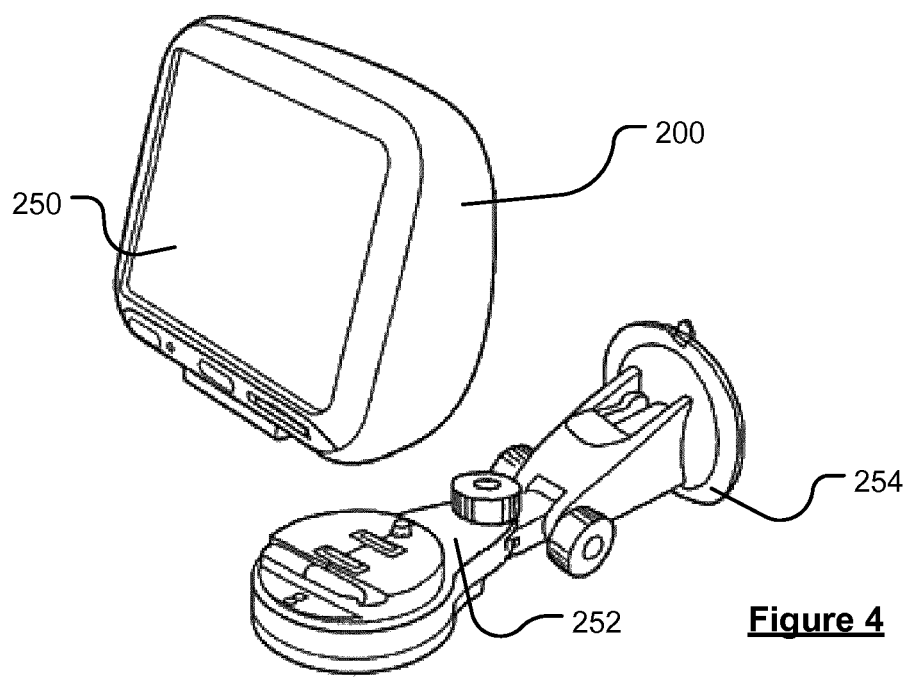
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

The processor 202 and memory 214 cooperate to support a BIOS (Basic Input/Output System) that functions as an interface between functional hardware components 280 of the navigation device 200 and the software executed by the device. The processor 202 then loads an operating system from the memory 214, which provides an environment in which application software (implementing some or all of the described route planning and navigation functionality) can run. The application software provides an operational environment including the Graphical User Interface (GUI) that supports core functions of the navigation device, for example map viewing, route planning, navigation functions and any other functions associated therewith. In this respect, part of the application software comprises a view generation module.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time. In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Embodiments of the invention will now be described by reference to FIGS. 5 to 11.

The embodiments of the invention are carried out in relation to electronic map data comprising a plurality of segments indicative of segments of a navigable network, e.g. a road network. The segments are connected by nodes. The methods are described as being performed by a portable navigation device (PND) associated with a vehicle of a user. However, it will be appreciated that other forms of navigation device may be used, e.g. an integrated in-vehicle device. Furthermore, the navigation device may be any mobile device having navigation functionality. In other embodiments, it is envisaged that at least some of the steps may be performed by a server, such that the method may be carried out by a server, alone, or in combination with a navigation device, e.g. PND.

Figure 5:
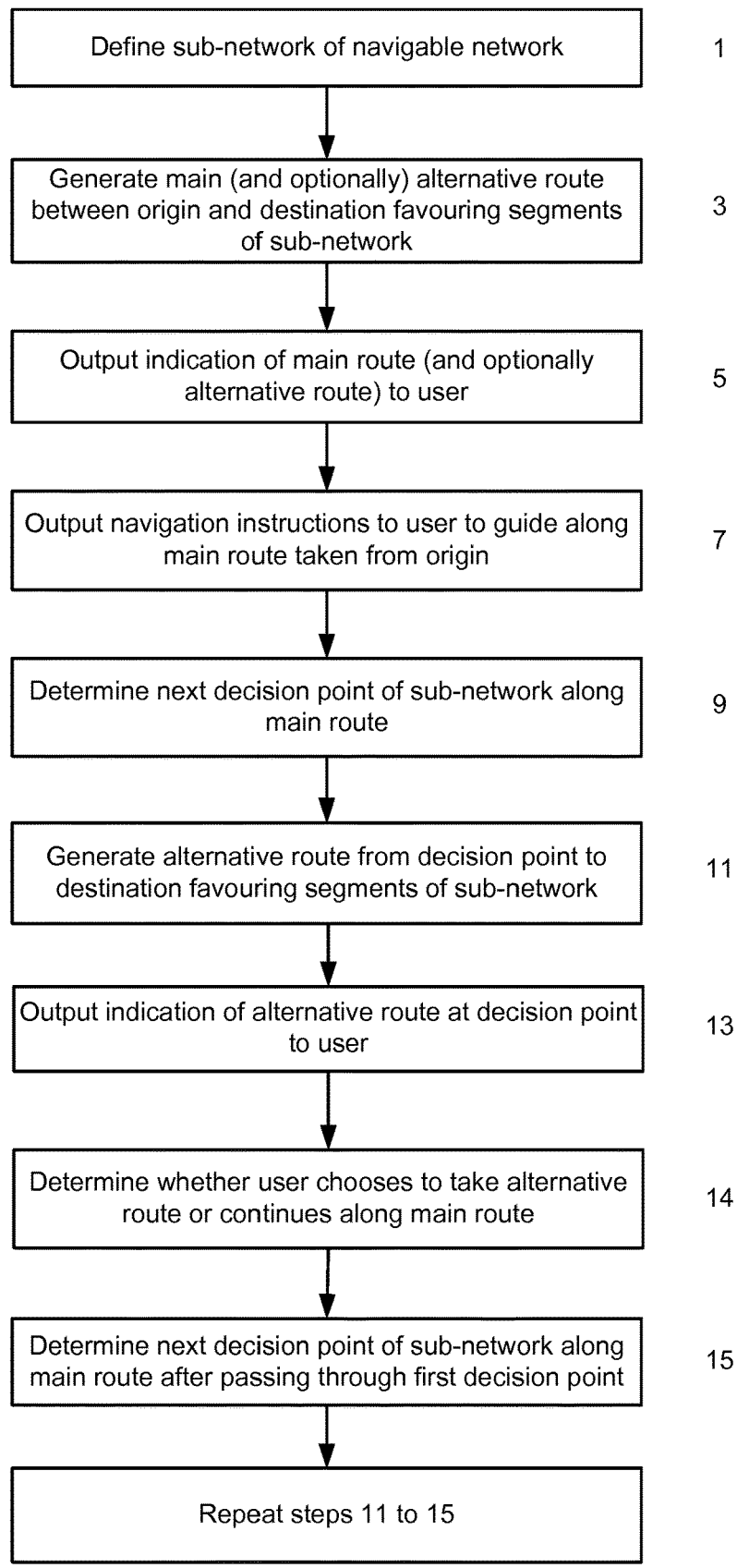
FIG. 5 illustrates a method for generating alternative routes at a decision point in accordance with one exemplary embodiment of the invention.

Referring to FIG. 5, in accordance with step 1, a sub-network of the navigable network is predefined. This may be carried out by listing the identities of the segments of the network which form part of the sub-network. The sub-network is defined by segments forming part of a network of intersecting routes between a first origin-destination pair of the network.

In step 3, a main route is generated between a second origin-destination pair of the network, which may or may not be the same as the first origin-destination pair. This step may be carried out immediately prior to departure from the origin. Generation of the main route takes into account live data, e.g. current traversal times or speeds for segments based upon current traffic conditions. An alternative route between the second origin-destination pair is also generated, although this is an optional step.

It will be appreciated that steps 1 and 3 may be carried out in either order, or even contemporaneously. Some examples will now be discussed.

The sub-network is, in some embodiments, a personal network, made up of segments of routes previously traveled through the network by a given user between an origin and destination. These might be frequently traveled routes of a user between home and work, etc. Such routes may be stored by a navigation device associated with a vehicle of the user recording positional data as appropriate during travel of the user along routes between the origin and destination, as known in the art.

The main route may then be generated as a least cost route, e.g. with respect to time, distance or fuel consumption, through the personal sub-network between the same origin and destination as the origin and destination between which the routes of the sub-network extend. The main route is then confined to the sub-network. In other embodiments, the main route may be generated through the navigable network as a whole, between either the same origin-destination pair as the routes of the sub-network, or alternatively between a different origin-destination pair. The main route may be a least cost route through the network as a whole. Thus the main route may or may not then be determined by reference to the sub-network. In some embodiments the main route is determined through the navigable network as a whole, but in a manner which favours segments of the personal sub-network. The segments of the sub-network may be favoured in any suitable manner. This may be carried out, for example, by manipulating the cost associated with each segment included in the sub-network to be lower than it would otherwise be. Where the generated main route is not confined to the personal network, the route may be added to the sub-network to extend the sub-network.

In other embodiments, the sub-network is made up of segments of a plurality of alternative routes which have been calculated between the first origin and destination pair. In some embodiments the alternative routes are generated by reference to the main route. Thus, the main route between the second origin-destination pair is generated e.g. being a least cost route, and a plurality of alternative routes to the main route then determined between the second origin-destination pair to provide the routes whose segments define the sub-network. The first and second origin-destination pairs will then be identical. In other embodiments, the alternative routes of the sub-network may be generated without reference to the main route, and vice versa.

The alternative routes may be calculated by reference to a cost of traversing segments of the network. The cost may be determined by reference to an expected traversal time for the segments. As known in the art, each segment of the electronic map is associated with one or more expected traversal times or speeds in respect of given time periods, e.g. for particular timeslots on each day of the week. These traversal times are based upon historical data for the applicable time period. These traversal times may be used to generate a plurality of routes taking into account traversal time.

In some preferred embodiments the alternative routes are calculated using techniques developed as part of the above described eCOMPASS project. According to the eCOMPASS techniques, an "alternative graph" is obtained, being an aggregation of alternative paths between an origin and destination. The method involves filtering and rating all alternative paths between the origin and destination, based on certain quality criteria. The criteria take into account the total distance of overlap between the paths of the alternative graph. It is desirable that paths should not overlap to too great an extent. Thus, it is sought to minimise the overlap between paths. In addition, it is sought to minimise the cost associated with the alternative paths relative to a least cost path between the origin and destination. This typically involves minimising the length of the paths relative to a shortest path between the origin and destination. Other factors may be taken into account to try to limit the complexity of the alternatives network represented by the alternatives graph, i.e. the number of paths and decision points.

The main improvement in the eCOMPASS techniques for determining alternative routes involves modifying the techniques used in obtaining an alternative graph. In particular, the eCOMPASS techniques seek to improve the so-called "Plateau" and "Penalty" methods used in determining alternative graphs. These methods are described under section 3 of the above mentioned "Improved Alternative Route Planning" publication. As described under section 4 of the "Improved Alternative Route Planning" document, and section 5.3 of the "FP7—Information and communication technologies: Grant Agreement No. 288094: D2.3.2—Validation and empirical assessment of algorithms for eco-friendly vehicle routing: Workpackage WP2—Algorithms for Vehicle Routing" document, a pruning stage is introduced prior to carrying out either of these methods to attempt to reduce the search space, but in a manner which limits any negative impact on the quality of the resulting alternative graphs. Additionally, a new approach to filtering plateaus is used to obtain plateaus that provide the best alternative paths. The penalty method is tuned by choosing penalty factors on the already a set of already computed paths, in order to obtain the next best alternatives.

Figure 6:
FIGS. 6 and 7 illustrate sets of alternative routes obtained between an origin and destination using conventional and improved eCOMPASS techniques respectively.
Figure 7:

FIGS. 6 and 7 illustrate the improvement that may be offered by the e-compass techniques. FIG. 6 illustrates a main route 1 between a current position 3 and a destination 5. Also shown are a number of alternative routes (shaded in lighter colour with periodic dots) between the same current position and destination. These have been obtained by blocking the central portion of the main route from inclusion in the alternative routes. It may be seen that many of these routes include significant detours due to the constraint placed on overlap with the main route. FIG. 7 illustrates a network of alternative routes obtained between the same current position 3 and destination 5, based on the same main route 1. It may be seen that these are more user-friendly. FIG. 7 therefore provides an example of a network of intersecting alternative routes between an origin destination pair whose segments may provide the sub-network used in the present invention.

The way in which the sub-network of routes through the network is obtained for use in accordance with the present invention will not be described further, as the routes may be obtained using various techniques, provided that a sub-network within the navigable network is defined, being made up of segments belonging to alternative routes between an origin and destination. However it is obtained, the sub-network is a predetermined, static network, which does not change during travel along the route. The sub-network includes a number of decision points at which multiple outgoing segments exist.

In step 5, an indication of the main and alternative routes is output by the navigation device to the user to enable the user to select their desired route. The user may either manually select their desired route, or this may be inferred from the path of the user once they start to travel along a route from the origin. Details of the way in which this may be carried out will not be described, but may be similar to the techniques used in determining the path of a user taken at a decision point of the sub-network along the route after leaving the origin described later.

In step 7, the navigation device outputs navigation instructions to the user to guide them along the route taken from the origin (the "main" route). Assuming that the user takes the main route, the navigation device generates navigation instructions for guiding the user along the original main route. If the user takes the alternative route, the navigation device takes this route as the new main route, and generates navigation instructions for guiding the user along that route. It will be appreciated that it is not necessary to offer an alternative route from the origin.

In step 9, the navigation device determines the next decision point of the sub-network which will be encountered along the main route being traveled. The continuation of the main route from the decision point to the destination will already be known. The navigation device now generates an alternative route from the decision point to the destination— step 11. This alternative route is generated in a manner which favours segments forming part of the sub-network, and takes into account live data relating to conditions on the network, e.g. live traversal times or speeds for segments based upon current traffic conditions. Furthermore, when generating the alternative route, the first segment along the continuation of the main route from the decision point to the destination is blocked, such that it may not be included in the resulting generated route. This helps to ensure that the alternative route differs from the main route, being forced along a different outgoing segment at the decision point. The step of generating the alternative route at the decision point may be triggered when the current position of the user comes within a predetermined distance of the decision point. The alternative route may be stored in a database, referred to herein as a route pool, of the navigation device in accordance with certain preferred embodiments, which are described below. In these arrangements, the alternative route may be stored in association with an indication of the first segment outgoing from the first decision point that forms part of the route. The continuation of the main route, and the outgoing segment at the first decision point forming part of the route may also be stored in the route pool or elsewhere.

In this way, a main and alternative route are provided, emanating from the next decision point of the sub-network to be encountered. As the alternative route has been generated in a manner which favours segments of the sub-network, it will tend to follow segments of the sub-network, thus being guided by the predetermined routes to the destination forming the sub-network. This may help to push the route toward routes that have already been determined to be useful, or which have previously been travelled. However, the route generation process is not constrained to follow only segments of the sub-network. Thus, if current traffic conditions mean that flow along a segment of the sub-network is severely affected, then the route generated may bypass the segment, although will typically gravitate back toward the sub-network once the affected region has been passed, as a result of favouring the segments of the sub-network during the route generation process. If traffic flow is severely affected along a segment of the sub-network, this may outweigh any favouring of the segment by virtue of forming part of the sub-network. The same will apply to the initially generated main and optionally alternative routes from the origin in embodiments in which these have been generated to favour the sub-network.

In step 13 the navigation device outputs an indication of the alternative route at the first decision point to the user to enable the user to decide whether to take the alternative route, or continue on the main route. As will be described in more detail below, this may be carried out by providing an icon indicative of the existence of the alternative route together with icons indicative of the current position and the position of the decision point along the main route on a linear representation of the main route. The representation of the main route may be in the form of a route bar or a traffic bar, as described below. Of course, any other methods of drawing the user's attention to the existence of the alternative route may be used.

It is determined whether the user chooses to take the alternative route, or to continue along the original main route after passing the first decision point—step 14. This may be carried out in various manners, and some exemplary methods are described below. In some embodiments the user provides an input indicative of their planned route. This may typically be provided prior to the user reaching the first decision point. In other embodiments the navigation device infers the route taken by the user by consideration of the current position after passing the first decision point.

If the user has continued along the original main route, the navigation device continues to generate navigation instructions in relation to the main route. If the user took the alternative route, the navigation device treats the alternative route as a new main route after passing through the first decision point, and provides navigation instructions in respect of the new main route.

In step 15, the navigation device identifies the next decision point of the sub-network along the main route after passing through the first decision point. The next decision point may be the next decision point of the sub-network when travelling along the original main route, if that is the route taken by the user at the first decision point. However, if the user chose to take the alternative route at the first decision point, then the next decision point will be the next decision point of the sub-network to be encountered along this new main route, i.e. corresponding to the previous alternative route. Once the current position is within a predetermined distance of this next decision point, the navigation device generates an alternative route from the decision point to the destination, in the same manner as with the first decision point, repeating steps 11 and 13 as appropriate. Thus, the alternative route is generated favouring segments of the sub-network, and in a manner which blocks the outgoing segment of the current main route at the decision point. An indication of the alternative route is output to a user.

Once again, depending upon the path taken by the user, either the continuation of the existing main route at the decision point, or the alternative route, becomes the new main route after passing through the decision point, and navigation instructions are output in respect of the main route. The next decision point of the sub-network along that main route is identified, and steps 11 to 15 repeated once more, and so on, until the next decision point of the sub-network is the destination. If no further decision point of the sub-network can be determined between the current position and the destination, then, if desired, a new sub-network of alternative routes may be defined between the current position and the destination, using any of the earlier described techniques. The first decision point of this sub-network along the main route may be identified, and an alternative route determined, and so on, repeating steps 11 to 15, until the destination is reached, or a further sub-network needs to be defined. A new sub-network may be defined where there is some distance between the current position and the destination, i.e. such that alternative route options are desirable. This situation might arise where a user takes a turn onto a ring road of a town, which may not intersect with an original sub-network of routes defined in the inner city area between an origin and destination.

It will be appreciated that in this way, alternative routes are generated in relation to decision points of the sub-network, which may correspond to more significant decision points, where useful alternatives are likely to exist. The use of the sub-network provides a way of selecting decision points in relation to which to generate alternative routes, avoiding overloading the user with information.

The origin and destination of the main route, i.e. the second origin destination pair, will generally correspond to, or be in proximity to the origin and destination of the sub-network alternative routes, i.e. the first origin destination pair, e.g. within 1 km. The sub-network may provide appropriate guidance when travelling along a route extending approximately between the first origin destination pair. However, it is not necessary that the origin destination pair coincide with those of the main route, or that the main route should pass through the first origin destination pair. For example, the sub-network may be between home and work locations of a user. This network may still be used to guide the user travelling between a location near home to work, or from home to near work, etc, such as parking locations in the vicinity of home or work.

While the embodiments of the invention above have been described in relation to generating a single alternative route at each decision point, it will be appreciated that multiple alternative routes may be generated. This may be achieved by blocking the first outgoing segment of the existing main route, and also any already generated alternative route at the decision point in the route generation process. A user may then be presented with multiple alternative routes from which to choose at the next decision point of the sub-network.

In contrast to some known techniques, the present invention may not always provide a faster alternative route at a decision point, but rather provides a method which enables a useful alternative route to be provided, if desired at each upcoming decision point of a sub-network along a current main route, providing the user with greater choice, and ability to control their route to the destination.

In accordance with some further aspects, the present invention also provides methods for automatically determining the path taken by a user at a decision point. Such methods may be used in conjunction with the earlier described embodiments, providing a method to detect whether a user has continued on the main path, or taken the (or an) alternative path at the first, or a subsequent decision point. However, the methods may also be used independently of the methods described by reference to FIG. 5.

Figure 8:
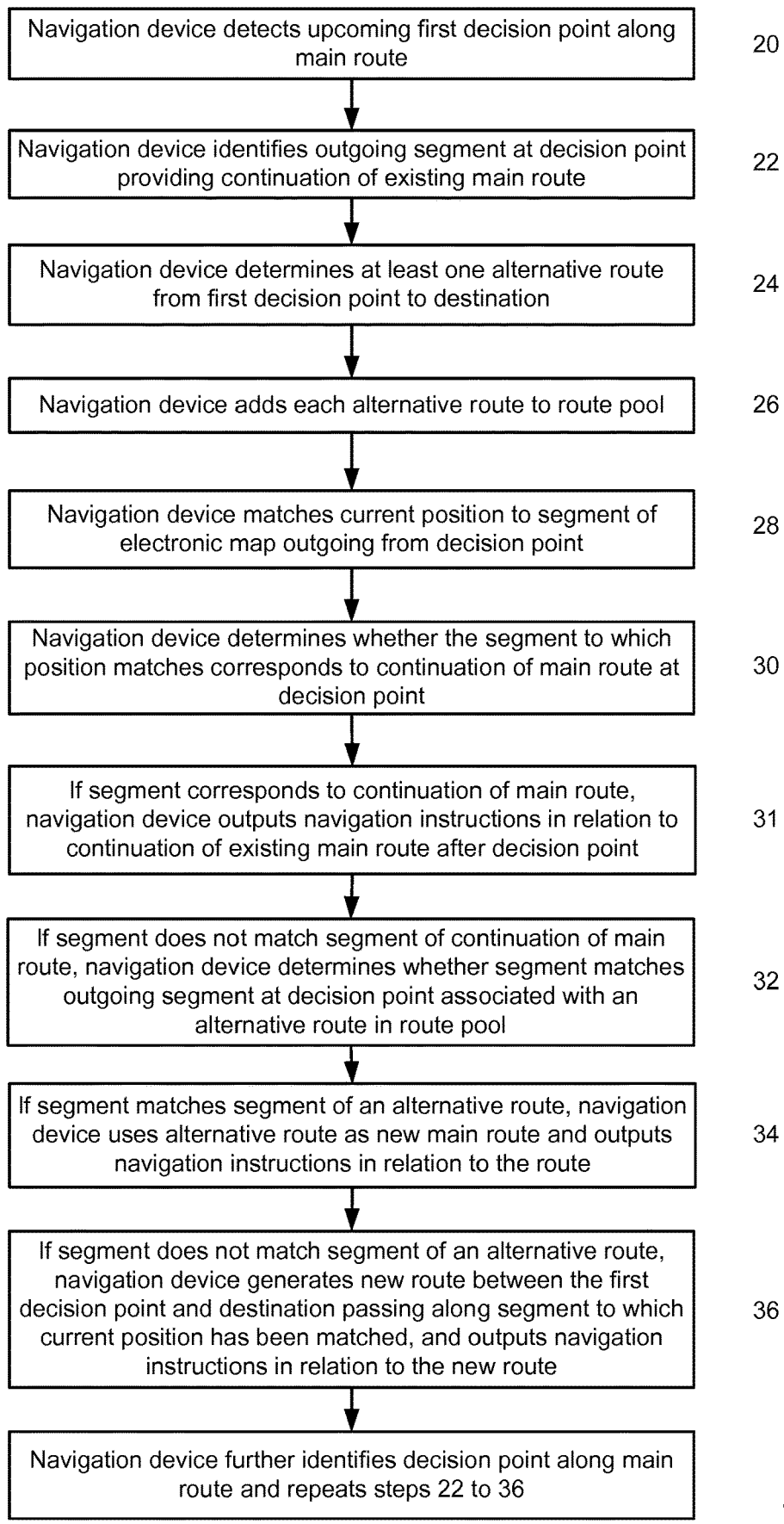
FIG. 8 illustrates a method for determining a path taken by a user at a decision point in accordance with one exemplary embodiment of the invention.
Figure 9:
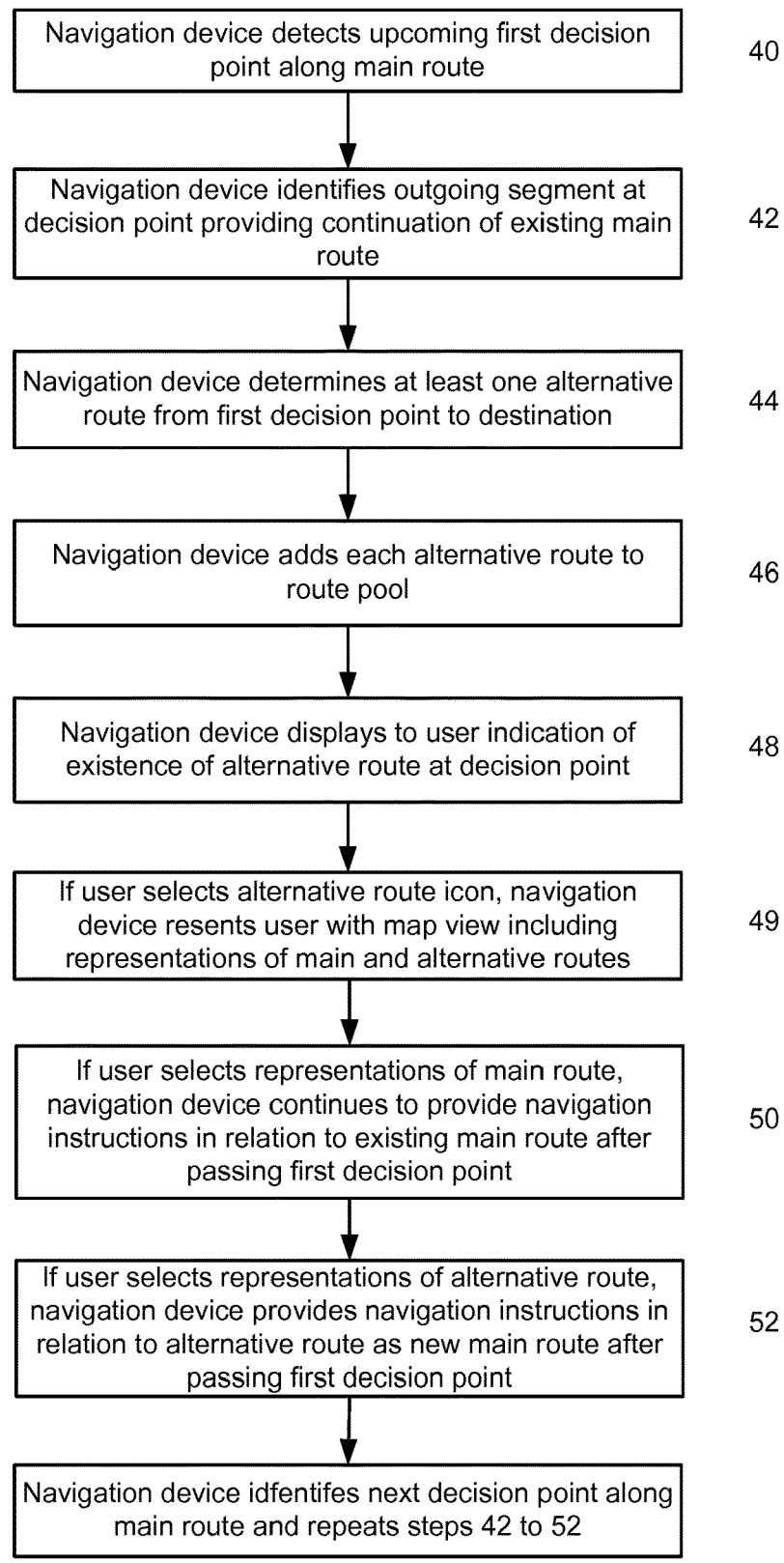
FIG. 9 illustrates a method for providing alternative route options to a user in accordance with one exemplary embodiment of the invention.

This further aspect of the invention will be described by reference to FIG. 8. A user is travelling along a main route from an origin to a destination. In accordance with step 20 the navigation device detects an upcoming first decision point after leaving the origin along the main route ahead. This decision point is advantageously a next decision point of a sub-network, as described in relation to the earlier embodiment of FIG. 5. However, these further aspects and embodiments of the invention are equally applicable to detecting routes taken by a user through a network of navigable segments in relation to which no sub-network has been predefined. In those cases, the decision point may be a next decision point along the main route, or at least a decision point that is desired to provide alternative route options in relation to, for example, a more significant decision point of the network.

When the current position of the user is within a predetermined distance of the detected first decision point, the navigation device creates a route pool of possible alternative routes that may be taken at the decision point. The navigation device identifies the outgoing segment at the decision point that provides the continuation of the existing main route—step 22. The navigation device then determines at least one alternative route from the first decision point to the destination—step 24. Ideally multiple alternative routes are determined. Each alternative route is along a different outgoing segment at the first decision point, and each alternative route passes along an outgoing segment that is different to the outgoing segment along which the continuation of the main route passes. The alternative routes may be obtained using the methods described in relation to the earlier aspect of the invention, described by reference to FIG. 5, involving favouring segments of a sub-network, and/or blocking certain outgoing segments at the decision point. However, this is not necessary, and this aspect of the invention may be carried out independently of the earlier aspect. In some embodiments each alternative route is a route that is optimised with respect to a given property, such as estimated time of arrival, length or fuel consumption.

The navigation device adds each alternative route to a route pool, i.e. stores the data in the route pool, being associated with data indicative of the outgoing segment at the decision point that forms part of the route—step 26. Thus, the route pool will comprise segment identifiers for routes associated with each alternative route, which identifiers can be used to look up the applicable route in the route pool. Navigation instructions are generated for each alternative route determined. This enables an alternative route to be immediately used as a new main route, if it is determined that it has been taken by a user.

In addition, data indicative of one or more properties of the route may be determined and stored, optionally in the route pool. The properties may include estimated time of arrival, length, traffic condition or fuel consumption. As the user travels along the main route toward the destination point, such property data is updated. In this way, a current value for any dynamically changing properties of each alternative route will be known. Such properties, e.g. estimated time of arrival, traffic conditions, fuel consumption, etc, may be used to display current information about the route to a user, or to select a route from multiple alternative routes stored for output to a user.

Once the current position of the user has passed the first decision point, the navigation device matches the current position to a segment of the electronic map—step 28. Any map matching technique known in the art may be used. The navigation device obtains the segment identifier for the segment, and determines whether the segment identifier (ID) matches that of the outgoing segment at the first decision point that is associated with the continuation of the main route—step 30. If the segment ID matches that of the outgoing segment associated with the main route, the user is assumed to have continued along the main route after passing through the first decision point, and the navigation device continues to provide navigation instructions in relation to the existing main route—step 31. If the segment ID does not match that of the outgoing segment associated with the main route, the navigation device now checks whether the segment ID matches that of any of the outgoing segments associated with alternative routes in the route pool—step 32. If the segment ID does match the segment ID of one of the outgoing segments associated with an alternative route, the navigation device takes that route as the new main route after passing through the first decision point, and provides navigation instructions in relation to this route—step 34. If the segment ID does not match the segment ID of any one of the outgoing segments associated with an alternative route included in the route pool, the navigation device generates a new alternative route between the first decision point and the destination passing along the segment to which the current position has been matched—step 36. This may be carried in the same manner as generating the previous alternative route from the first decision point, and may involve favouring segments of a sub-network. This new alternative route is taken as the new main route after passing through the first decision point, and navigation instructions are generated and provided in relation to this new main route.

In this way, a new main route for travel from the first decision point toward the destination is obtained, being either a continuation of the original main route, one of the stored alternative routes, or a newly generated alternative route. Navigation instructions are provided in relation to the new main route.

The navigation device then identifies a second decision point along the new main route after passing the first decision point. This may be the next decision point of a sub-network, or any other upcoming decision point in relation to which it is desired to provide alternative route options, which may or may not be the next decision point along the route. Steps 22 to 36 are then repeated as appropriate. A segment providing a continuation of the main route from the upcoming second decision point to the destination is identified. One or more alternative routes are generated along respective other ones of the outgoing segments at the second decision point, and data indicative of each route is added to the route pool, in association with the outgoing segment at the second decision point along which the route passes. This data is used to refresh the corresponding data stored in relation to the first decision point. Navigation instructions are generated in respect of each alternative route. It will be appreciated that once the first decision point has been passed, such data is no longer needed, and the route pool can be repopulated with data regarding possible routes at the next decision point to be considered, i.e. the second decision point. The new main route after passing through the second decision point is identified by consideration of the outgoing segment at the second decision point including the current position, and navigation instructions generated in relation to this new main route. Once again, a further decision point along the new main route may be identified, and the route pool refreshed with route data in relation to this decision point, and the steps 22 to 36 repeated, and so on, until the destination is reached. In this way, the user may be provided with at least one alternative route option at each decision point considered along the route, e.g. each decision point of a sub-network.

In some embodiments in which data indicative of one or more dynamically changing properties of the alternative route(s) in the route pool is updated during travel along the main route toward a decision point, the method may involve detecting when a change in a parameter indicative of such a property exceeds a given threshold e.g. an estimated time of arrival moves on by more than a given amount, or the fuel consumption increases by more than a given amount. This may then trigger refreshing of the route pool, with a new set of one or more routes being generated between the decision point and the destination. The data indicative of each route, and the outgoing segment with which it is associated will then be used to replace the corresponding data in respect of the original set of alternative routes. Each route may be optimised with respect to a given property. In this way, by updating the route pool if current conditions have caused a significant change in route properties, it may be possible to maintain a pool that includes a set of alternative routes that are optimal under current conditions. This may be carried out in relation to the first or any subsequent decision point where dynamically changing route properties are monitored.

The present invention also, in accordance with some further aspects, provides methods for providing a user with information regarding route options at upcoming decision points to enable the user to manually indicate the route that they plan to take at the decision point. Once again, such arrangements may utilise main and alternative routes generated using the methods described in relation to FIG. 5, i.e. favouring segments of a sub-network. However, these further aspects of the invention may, like the aspects described in relation to FIG. 8, be implemented independently of the earlier aspects, and do not require a sub-network to be predefined.

The present invention in accordance with these further aspects will be illustrated by reference to FIGS. 9, 10a to 10d and 11a to 11d. These aspects involve generating route pool data in respect of possible routes at an upcoming decision point during travel along a route as described in relation to the FIG. 8 embodiment.

A user is travelling along a main route from an origin to a destination. In accordance with step 40 the navigation device detects an upcoming first decision point after leaving the origin along the main route ahead. This decision point is advantageously a next decision point of a sub-network, as described in relation to the earlier embodiment of FIG. 5. However, these further aspects and embodiments of the invention are equally applicable to detecting routes taken by a user through a network of navigable segments in relation to which no sub-network has been predefined. In those cases, the decision point may be a next decision point along the main route, or at least a decision point that is desired to provide alternative route options in relation to, for example, a more significant decision point of the network.

When the current position of the user is within a predetermined distance of the detected first decision point, the navigation device creates a route pool of possible alternative routes that may be taken at the decision point. The navigation device identifies the outgoing segment at the decision point that provides the continuation of the existing main route—step 42. The navigation device then determines at least one alternative route from the first decision point to the destination—step 44. Multiple alternative routes may be determined. Each alternative route is along a different outgoing segment at the first decision point, and each alternative route passes along an outgoing segment that is different to the outgoing segment along which the continuation of the main route passes. The alternative routes may be obtained using the methods described in relation to the earlier aspect of the invention, described by reference to FIG. 5, involving favouring segments of a sub-network and/or blocking certain outgoing segments at the decision point. However, this is not necessary, and this aspect of the invention may be carried out independently of the earlier aspect. The navigation device adds each alternative route to a route pool. The alternative route may be associated with data indicative of the outgoing segment at the decision point that forms part of the route—step 46. Navigation instructions are generated for each alternative route determined. This enables an alternative route to be immediately used as a new main route, if it is selected by a user.

In addition, data indicative of one or more properties of the route may be determined and stored, optionally in the route pool. The properties may include estimated time of arrival, length, traffic condition or fuel consumption. As the user travels along the main route toward the destination point, such property data is updated. In this way, a current value for any dynamically changing properties of each alternative route will be known. Such properties, e.g. estimated time of arrival, traffic conditions, fuel consumption, etc, may be used to display current information about the route to a user, or to select a route from multiple alternative routes stored for output to a user. In step 48 the navigation device displays to the user an indication of the existence of the alternative route at the next decision point, i.e. the first decision point. The indication is in the form of an icon indicative of the existence of the alternative route. The invention will be illustrated in respect to indicating a single alternative route at the decision point, involving a right turn along an outgoing segment at the decision point. It is envisaged that multiple alternative routes may be presented to a user in respect of a decision point. However, it may be desirable to choose a single alternative route for presentation to the user, possibly from multiple alternative routes derived for the decision point, to avoid overloading the user.

In some embodiments, the alternative route that is presented to the user is selected based upon a property of the route, such as fuel economy, estimated time of arrival or duration. The route may be a route that is optimised with respect to this property. The route pool may comprise a plurality of alternative routes, each of which is optimised with respect to a different given property. This may enable a user to be presented with an alternative route that is optimised with respect to whichever property is of interest, e.g. fuel economy or duration.

Figure 10A:
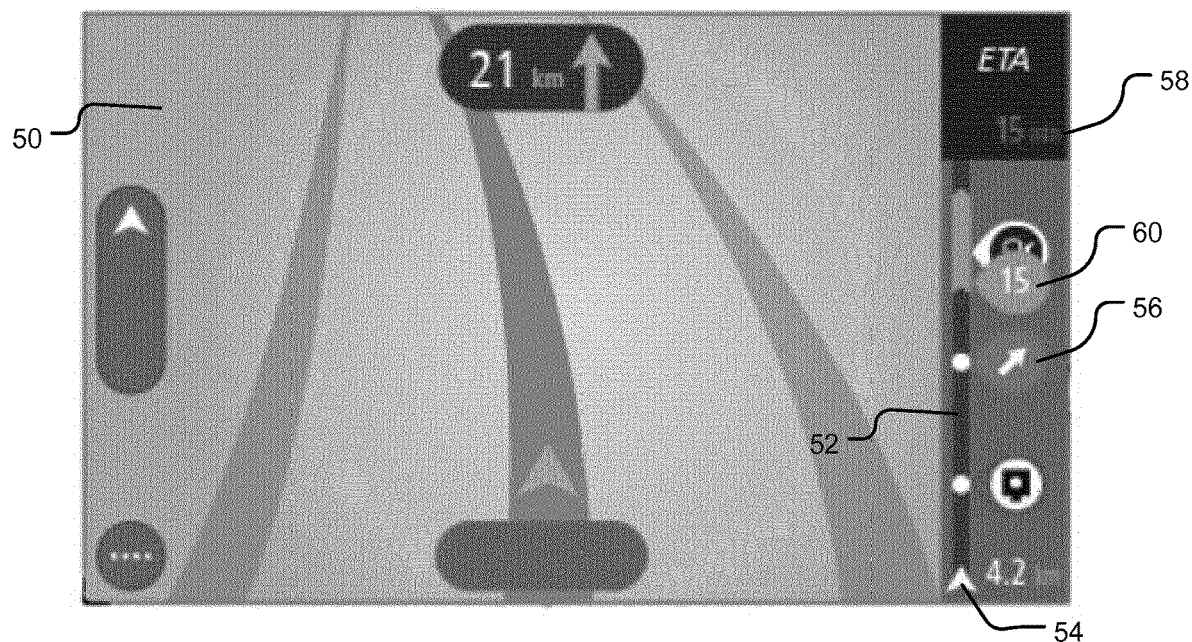
FIGS. 10a to 10d illustrate exemplary displays which may be output to a user at different stages in the method of FIG. 9.

In some embodiments, data indicative of one or more dynamically changing properties of the alternative route(s) in the route pool is updated during travel along the main route toward a decision point. This may be carried out as a continual background process. The method may involve detecting when a change in a parameter indicative of such a property exceeds a given threshold, e.g. an estimated time of arrival moves on by more than a given amount, or the fuel consumption increases by more than a given amount. This may then trigger refreshing of the route pool, with a new set of one or more routes being generated between the decision point and the destination. The data indicative of each route will then be used to replace the corresponding data in respect of the original set of alternative routes. Each route may be optimised with respect to a given property. In this way, by updating the route pool if current conditions have caused a significant change in route properties, it may be possible to maintain a pool that includes a set of alternative routes that are optimal under current conditions. This may be carried out in relation to the first or any subsequent decision point where dynamically changing route properties are monitored. One way in which an alternative route may be presented to a user in accordance with an embodiment of the invention is shown in FIG. 10a. The navigation device displays a 2D navigation map 50, illustrating the road ahead (3D map views may, of course, alternatively be used). On the right of the display a route bar 52 is provided, being a linear representation of the route ahead, from the current position to a point beyond the first decision point. The route bar 52 includes a current position icon 54, and an icon indicative of the first decision point 56. The first decision point 56 is the next decision point along the route. Also shown are icons indicative of a speed camera and the location of a petrol station, but these will not be further described for the purposes of the present invention. Beyond the first decision point, a region 58 of the route is shaded and annotated with an icon 60, indicating the presence of a traffic jam, with an expected 15 minute delay. Rather than using a route bar type representation, the linear representation of the route may show the entire main route from the origin to the destination.

At the position of the first decision point 56, an icon 62 is provided, indicative of the existence of the alternative route. This icon is in the form of an arrow pointing to the right, indicating that the alternative route involves a right hand turn. The icon may be coloured to indicate whether the alternative route is faster than the main route being followed or not. An indication of a time saving (or time penalty) that would be incurred by taking the route relative to the main route may be displayed alternating with the arrow. It will be appreciated that the invention seeks to provide an alternative route option at each decision point along the route, or at least at each decision point at which it is desired to provide alternatives, e.g. significant decision points, decision points of a sub-network, etc. Thus, the alternative routes may not always be a faster route. The aim is to provide the user with greater choice, and control over their route taken. The icon 62 may be annotated to show that there is traffic affecting the route, such as using a red dot, or similar.

Figure 10B:
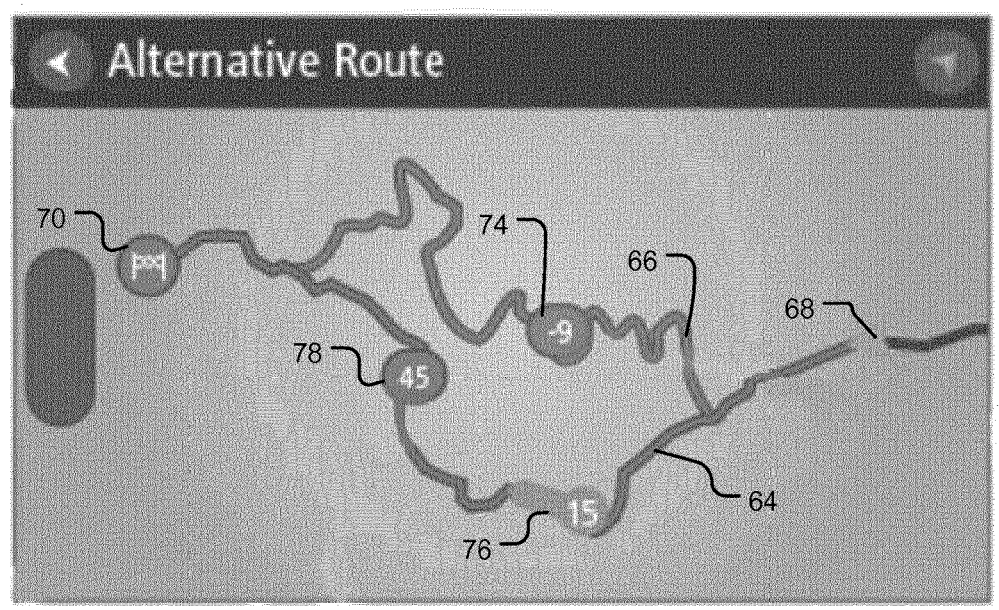

The icon 62 indicative of the alternative route may be selected by a user, e.g. by touching the icon. If the user selects the alternative route icon 62, the method involves presenting the user with a map view, illustrating the main route and the alternative route from the first decision point to the destination, together with comparative timing information for the routes—step 49. One such map view is shown in FIG. 10*b*. The map includes a representation 64 of the main route from the current position to the destination, a representation 66 of the alternative route from the first decision point to the destination, an icon indicative of the current position 68, and an icon indicative of the destination 70. The alternative route and the main route representations are coloured differently. An icon 74 indicates that the alternative route is 9 minutes faster than the main route. An icon 76 is provided associated with the representation of the main route, indicating that there is a traffic jam affecting a portion of the route, with a delay of 15 minutes expected. An icon 78 is provided associated with the representation of the main route indicating its duration (45 minutes). The representations of the main route and the alternative route are manually selectable by a user to enable the user to indicate which route they wish to take.

Figure 10C:
Figure 10D:
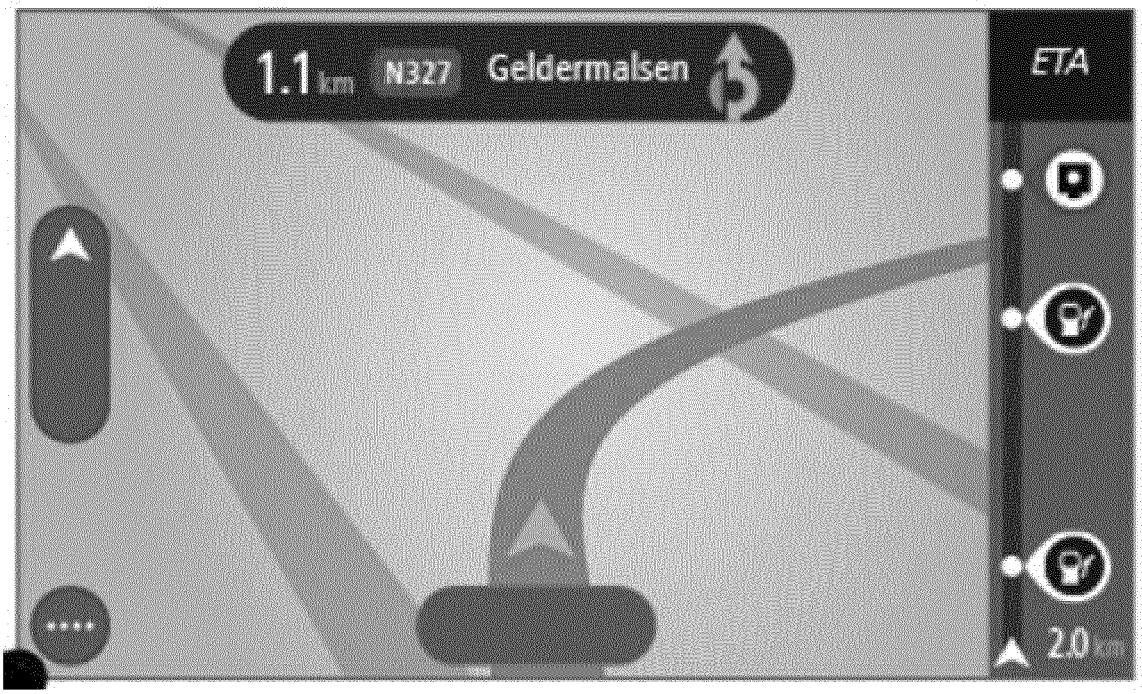

When it is detected that the user has selected the representation of the main route, the navigation device will disregard the alternative route, and continue to provide navigation instructions in relation to the existing main route after the user passes through the first decision point—step 50. The display reverts to the 2D map view, with an associated route bar as shown in FIG. 10*c*. The route bar no longer shows the first decision point and its alternative route. When it is detected that the user has selected the representation of the alternative route, the navigation device will take the alternative route as the new main route after passing through the first decision point, and will provide navigation instructions in relation to the alternative route from that point—step 52. FIG. 10*d* illustrates the display that may be provided to the user. The 2D map view now shows the route ahead as involving the right turn onto the alternative route at the decision point.

The navigation device then identifies the next decision point along the new main route—step 54. This will be referred to as the second decision point. This may be the next decision point of a sub-network, or any other upcoming decision point in relation to which it is desired to provide alternative route options, which may or may not be the next decision point along the route. Steps 42 to 54 are then repeated as appropriate. A segment providing a continuation of the main route from the upcoming second decision point to the destination is identified. One or more alternative routes are generated along respective other ones of the outgoing segments at the second decision point, and data indicative of each route is added to the route pool. This data is used to refresh the corresponding data stored in relation to the first decision point. Navigation instructions are generated in respect of each alternative route. The new main route will be the continuation of the previous main route from the first decision point, if the user selected to continue on the main route, or may be the alternative route generated in respect of the first decision point, if the user chose to select that route. The user is then presented with an icon indicating the existence of an alternative route at the second decision point, as in FIG. 10*a*, which may be selected to provide a map view, with selectable representations of the main and alternative routes as shown in FIG. 10*b*. The user may then select the representation of the main or alternative route as desired, determining the main route for the portion of the route from the second decision point onward. Once again, a further decision point along the new main route may be identified, and the route pool repopulated for the new main route to enable an alternative route option to be presented to the user for the decision point, and so on. This may be repeated until there are no further decision points before the destination.

Figure 11A:
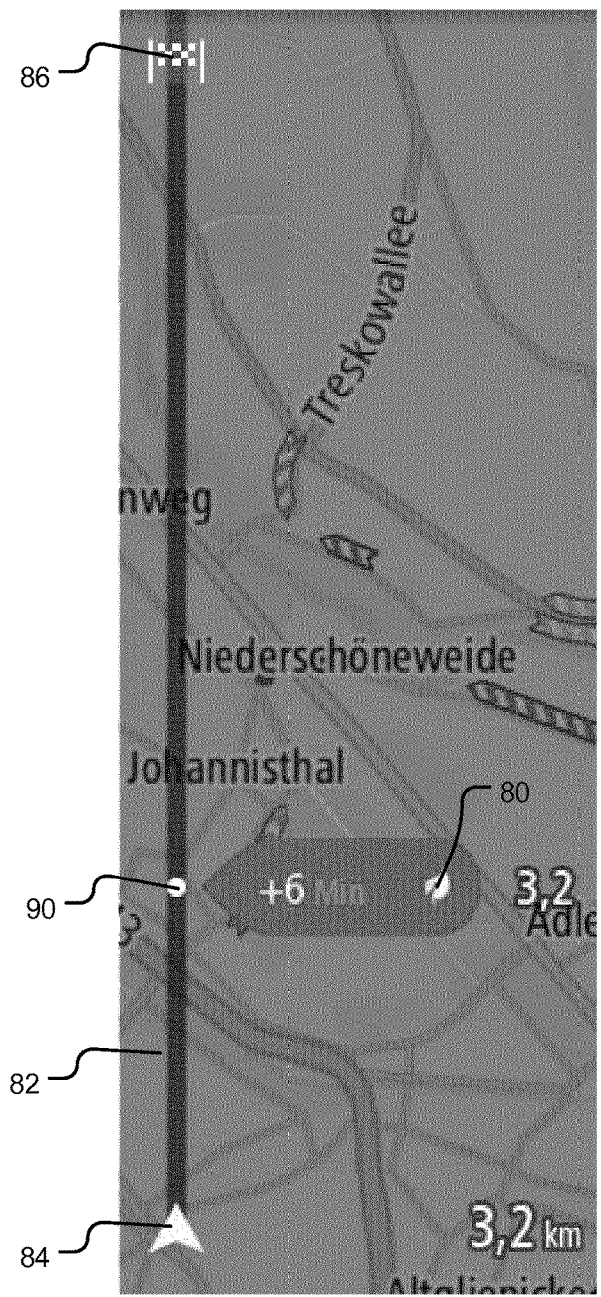
Figure 11C:
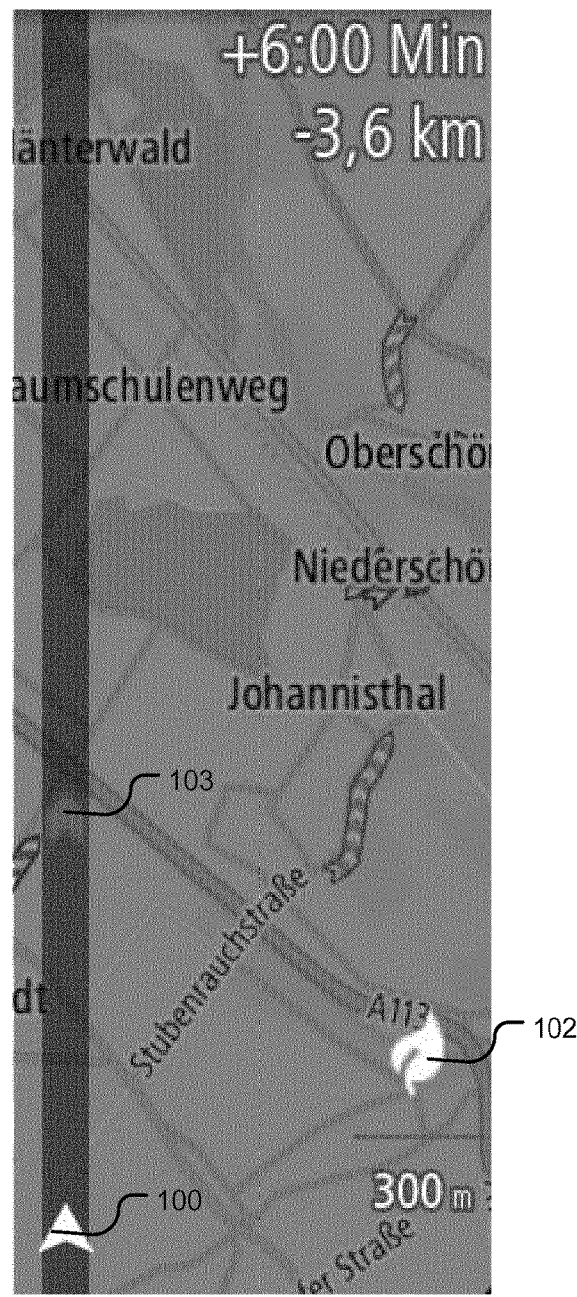
FIGS. 11c and 11d illustrate how the display may zoom in on the decision point closer thereto.
Figure 11B:
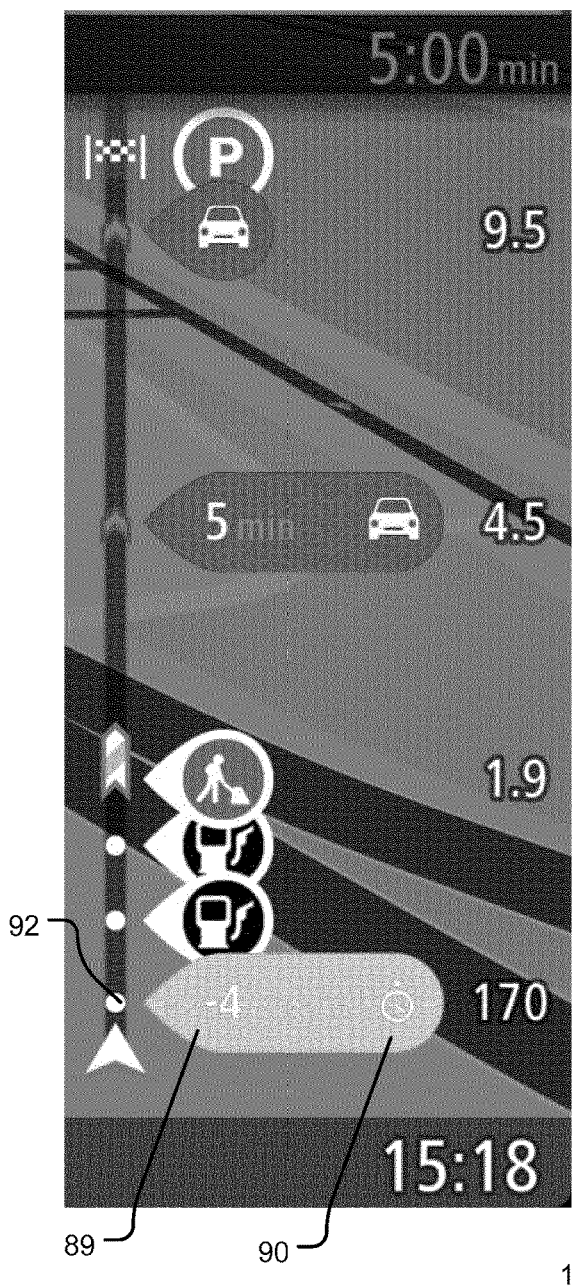

FIGS. 11*a* and 11*b* illustrate some alternative features which may be used in representing an alternative route on a linear representation of the main route in step 48. In particular these further embodiments indicate a property of the alternative route which has led to its being presented to the user, e.g. that the route is a fastest route, most economical route, shortest route, etc. Referring to FIG. 11*a*, display 82 shows the route between the current position icon 84 and the destination 86. An icon 88 indicates the existence of an alternative route at decision point 90. The icon indicates that the route is 6 minutes slower than the main route. An icon 80 indicates that the route is the most fuel efficient route available. FIG. 11*b* is a view similar to that shown in FIG. 11*a*, however, this time the icon 89 indicative of the alternative route at the decision point 92 indicates an icon 90, informing the user that it is a fastest route.

Figure 11D:
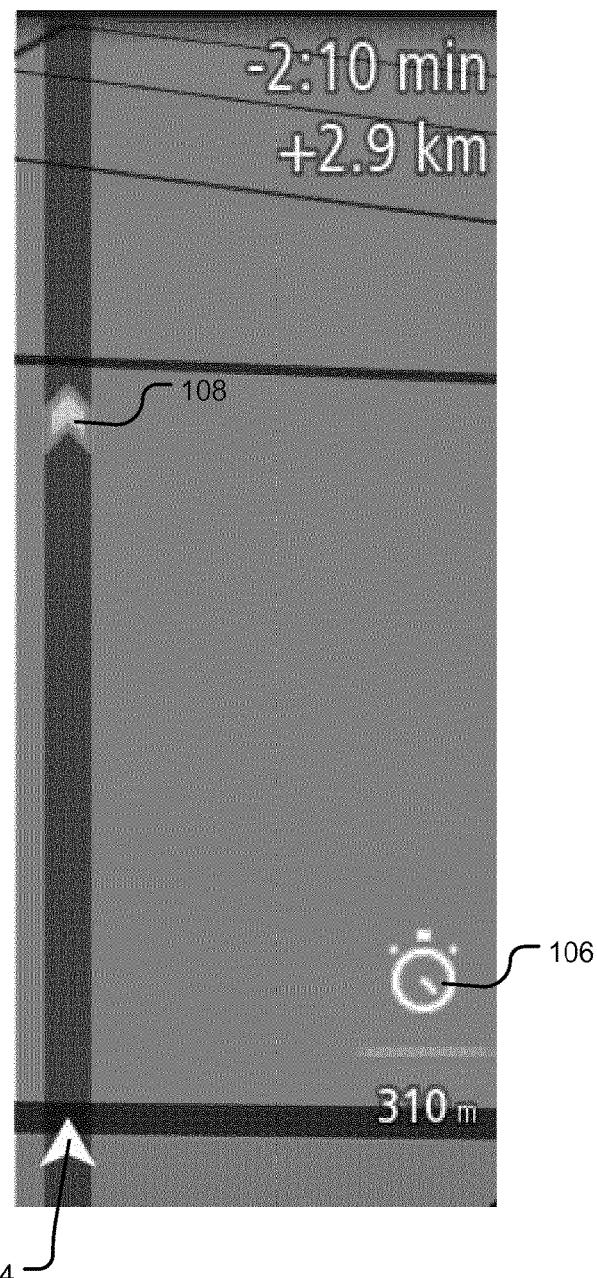

In some embodiments, when the current position comes within a predetermined distance of an upcoming decision point, e.g. 200 m, the display may zoom in on the decision point, and provide some additional details regarding an alternative route option. FIG. 11*c* illustrates such a view for the route to which FIG. 11*a* relates, when the current position is 300 m from the decision point. This view shows a route bar including the current location 100, and an indication of the position of the decision point having the alternative route 103. The decision point icon is coloured to indicate that the route is a more fuel efficient alternative, and an icon 102 is provided to this effect. In the top right hand corner additional information regarding the timing and distance of the route relative to the main route is provided, i.e.

showing that it is 6 minutes slower, and 3.6 km shorter. FIG. 11*d* illustrates another such view for the route to which FIG. 11*b* relates at 310 m from the decision point. This view shows a route bar including the current location 104, and an indication of the position of the decision point having the alternative route 108. The decision point icon is coloured to indicate that the route is a faster alternative, and an icon 106 is provided to this effect. In the top right hand corner additional information regarding the timing and distance of the route relative to the main route is provided, i.e. showing that it is 2.10 minutes faster, and 2.9 km longer. In the zoom views, the user may not select the alternative route to obtain a map view, to avoid distraction close to the decision point.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of determining a route taken by a user through a navigable network, the navigable network being represented by an electronic map comprising a plurality of segments representing navigable elements of the navigable network, the segments being connected by nodes, the method comprising:
   identifying a decision point that is upcoming along a main route being traveled by a user between an origin and a destination, at which decision point there are a plurality of outgoing segments, and at which decision point there are one or more alternative routes to the destination, wherein each alternative route passes along a different one of the outgoing segments at the decision point than an outgoing segment providing a continuation of the main route;
   generating one or more alternative routes between the decision point and the destination after identifying the upcoming decision point along the main route being travelled by the user;
   storing, in at least one database, data indicative of each of the alternative routes in association with data indicative of an outgoing segment at the decision point included in the alternative route;
   determining, when a current position of a user passes the decision point, whether the current position of the user can be matched to the outgoing segment providing the continuation of the main route, and, when the current position of the user cannot be matched to the outgoing segment providing the continuation of the main route, determining whether the current position of the user can be matched to an outgoing segment at the decision point included in one of the alternative routes that is stored in the at least one database;
   when the current position of the user can be matched to an outgoing segment at the decision point included in one of the alternative routes that is stored in the at least one database, obtaining the data indicative of that alternative route, and using that alternative route as a new main route from the decision point to the destination;
   when the current position of the user cannot be matched to an outgoing segment at the decision point associated with one of the alternative routes that is stored in the at least one database, identifying an outgoing segment to which the current position of the user can be matched, generating a route from the decision point to the destination along that segment, and using the generated route as a new main route from the decision point to the destination; and
   controlling, by a processor, one or more of a display and a speaker to output navigation instructions associated with the alternative route or the generated route for guiding the user along the new main route from the decision point to the destination.

2. The method of claim 1, wherein, if the current position of the user can be matched to the outgoing segment providing the continuation of the main route, maintaining the existing main route as the main route from the decision point to the destination.

3. The method of claim 1, wherein the at least one database is updated during travel to the destination so as to comprise data indicative of different alternative routes at different times.

4. The method of claim 1, comprising deleting the data in the at least one database relating to the alternative routes at the decision point after the current position of the user passes the decision point.

5. The method of claim 1, comprising:
   identifying an upcoming second decision point along the main route determined to be traveled by a user after passing through a first decision point, at which second decision point there are a plurality of second outgoing segments, and generating one or more alternative routes between the second decision point and the destination, wherein each alternative route passes along a different one of the second outgoing segments at the second decision point than the second outgoing segment providing a continuation of the main route; and
   storing, in the at least one database, data indicative of each generated alternative route in association with data indicative of the second outgoing segment at the second decision point included in the route.

6. The method of claim 5, comprising:
   determining, when a current position of a user passes the second decision point, whether a current position of the user can be matched to the second outgoing segment providing the continuation of the main route, and, if the current position of the user cannot be matched to the second outgoing segment providing the continuation of the main route, determining whether the current position of the user can be matched to a second outgoing segment at the second decision point associated with one of the alternative routes stored in the at least one database obtained for the second decision point,
   when the current position of the user can be matched to a second outgoing segment at the second decision point associated with one of the alternative routes for the second decision point stored in the at least one database, obtaining the data indicative of the second alternative route for the second decision point, and using the second alternative route for the second decision point as a new main route from the second decision point to the destination, and
   when the current position of the user cannot be matched to a second outgoing segment at the second decision point associated with one of the alternative routes for the second decision point stored in the at least one database, identifying a second outgoing segment to which the current position of the user can be matched, generating a route from the second decision point to the destination along that segment, and using the generated route as the new main route from the second decision point to the destination.

7. The method of claim 6, wherein, if the current position of the user can be matched to the second outgoing segment providing the continuation of the main route, maintaining the existing main route as the main route to the destination.

8. The method of any one of claim 5 comprising using said alternative route data stored in respect of the second decision point to replace the corresponding data determined for the first decision point in the at least one database.

9. The method of claim 1, comprising generating navigation instructions for guiding a user along each generated alternative route.

10. The method of claim 1, wherein the navigable network comprises a predefined subnetwork, the sub-network comprising a network of intersecting routes through the navigable network, the sub-network being represented by a subset of segments of the electronic map, and wherein nodes at which there are two or more outgoing segments of the subset of segments are indicative of decision points of the sub-network, and wherein the upcoming decision point along the main route is a next decision point of the sub-network ahead of a current position of the user along the main route.

11. The method of claim 10, wherein at least one of the main route and the or each alternative route is generated using a route generation process which favours the segments representative of the subnetwork.

12. The method of claim 1, wherein the method is performed by a portable navigation device.

13. A system for determining a route taken by a user through a navigable network, the navigable network being represented by an electronic map comprising a plurality of segments representing navigable elements of the navigable network, the segments being connected by nodes, the system comprising:
a processor; and
a memory;
the processor configured to:
identify a decision point that is upcoming along a main route being traveled by a user between an origin and a destination, at which decision point there are a plurality of outgoing segments, and at which decision point there are one or more alternative routes to the destination, wherein each alternative route passes along a different one of the outgoing segments at the decision point than an outgoing segment providing a continuation of the main route;
generate one or more alternative routes between the decision point and the destination after identifying the upcoming decision point along the main route being travelled by the user;
store, in at least one database, data indicative of each of the alternative routes in association with data indicative of an outgoing segment at the decision point included in the alternative route;
determine, when a current position of a user passes the decision point, whether the current position of the user can be matched to the outgoing segment providing the continuation of the main route, and, if the current position of the user cannot be matched to the outgoing segment providing the continuation of the main route, determine whether the current position of the user can be matched to an outgoing segment at the decision point included in one of the alternative routes that is stored in the at least one database for the decision point;
when the current of the user position can be matched to an outgoing segment at the decision point associated with one of the alternative routes that is stored in the at least one database, obtain the data indicative of that alternative route, and use that alternative route as the new main route from the decision point to the destination; and
when the current position of the user cannot be matched to an outgoing segment at the decision point associated with one of the alternative routes that is stored in the at least one database, identify an outgoing segment to which the current position of the user can be matched, generate a route from the decision point to the destination along that segment, and use the generated route as a new main route from the decision point to the destination; and
control one or more of a display and a speaker to output navigation instructions associated with the alternative route or the generated route for guiding the user along the new main route from the decision point to the destination.

14. The system of claim 13, wherein, if the current position of the user can be matched to the outgoing segment providing the continuation of the main route, maintaining the existing main route as the main route from the decision point to the destination.

15. The system of claim 13, wherein the system is a portable navigation device.

16. A non-transitory computer readable storage medium storing instructions which, when executed by one or more processors of a navigation device, cause the navigation device to perform a method for determining a route taken by a user through a navigable network, the navigable network being represented by an electronic map comprising a plurality of segments representing navigable elements of the navigable network, the segments being connected by nodes, the method comprising:
identifying an a decision point that is upcoming along a main route being traveled by a user between an origin and a destination, at which decision point there are a plurality of outgoing segments, and at which decision point there are one or more alternative routes to the destination, wherein each alternative route passes along a different one of the outgoing segments at the decision point than the outgoing segment providing a continuation of the main route;
generating one or more alternative routes between the decision point and the destination after identifying the upcoming decision point along the main route being travelled by the user;
storing, in at least one database, data indicative of each of the alternative routes in association with data indicative of an outgoing segment at the decision point included in the alternative route;
determining, when a current position of a user passes the decision point, whether the current position of the user can be matched to the outgoing segment providing the continuation of the main route, and, when the current position of the user cannot be matched to the outgoing segment providing the continuation of the main route, determining whether the current position of the user can be matched to an outgoing segment at the decision point included in one of the alternative routes that is stored in the at least one database;
when the current position of the user can be matched to an outgoing segment at the decision point included in one of the alternative routes that is stored in the at least one database, obtaining the data indicative of that alternative route, and using that alternative route as a new main route from the decision point to the destination; and when the current position of the user cannot be matched to an outgoing segment at the decision point associated with one of the alternative routes that is stored in the at least one database, identifying an outgoing segment to which the current position of the user can be matched, generating a route from the decision point to the destination along that segment, and using the generated route as a new main route from the decision point to the destination; and controlling one or more of a display and a speaker to output navigation instructions associated with the alternative route or the generated route for guiding the user along the new main route from the decision point to the destination.

* * * * *